US008754552B2

(12) United States Patent
Chen et al.

(10) Patent No.: US 8,754,552 B2
(45) Date of Patent: Jun. 17, 2014

(54) PERMITTIVITY-BASED PAPER SHREDDER CONTROL SYSTEM

(75) Inventors: Liangneng Chen, Tokyo (JP); Hsin-Hsiung Chen, Shanghai (CN); Kevin Chen, Rancho Palos Verdes, CA (US); Chung Shih Tsai, Hawthorne, CA (US)

(73) Assignee: Aurora Office Equipment Co., Ltd., Shanghai (CN)

( * ) Notice: Subject to any disclaimer, the term of this patent is extended or adjusted under 35 U.S.C. 154(b) by 792 days.

(21) Appl. No.: 13/026,868

(22) Filed: Feb. 14, 2011

(65) Prior Publication Data

US 2011/0133008 A1 Jun. 9, 2011

Related U.S. Application Data

(63) Continuation-in-part of application No. 12/841,992, filed on Jul. 22, 2010, now Pat. No. 8,008,812, which is a continuation-in-part of application No. 12/576,493, filed on Oct. 9, 2009, now Pat. No. 8,018,099, which is a continuation of application No. 11/827,798, filed on Jul. 12, 2007, now Pat. No. 7,622,831.

(30) Foreign Application Priority Data

Jul. 14, 2006 (CN) ...................... 2006 2 0043955 U

(51) Int. Cl.
*H02H 11/00* (2006.01)

(52) U.S. Cl.
USPC .......................................................... 307/326

(58) Field of Classification Search
USPC ............. 307/112, 326; 192/130; 241/34, 37.5
See application file for complete search history.

(56) References Cited

U.S. PATENT DOCUMENTS 6,376,939 B1 * 4/2002 Suzuki et al. ................. 307/326

FOREIGN PATENT DOCUMENTS

JP 2008-132407 12/2008

* cited by examiner

*Primary Examiner* — Carlos Amaya
(74) *Attorney, Agent, or Firm* — WHGC, P.L.C.; John F. O'Rourke

(57) ABSTRACT

The invention is directed to a permittivity-based paper shredder control system. The touching feature is implemented through a series of electronic circuits, taking input from a conductive touch panel on the shredder feed throat, processing the signal, and through a motor driving circuit, stopping the mechanical parts of the shredder. The system has a touch detection circuit unit, which contains a bioelectricity controlled switching circuit to sense the conductive touch panel. The bioelectricity controlled switching circuit is configured to trigger a ground switching circuit in the touch detection circuit unit which outputs to a multifunction bioshield controller. The bioshield controller then takes care of the remaining protection issues. The touching device for paper shredders protects humans and other living beings including pets from injuries through automatic and real time monitoring. The complete control process is both safe and sensitive.

25 Claims, 34 Drawing Sheets

PERMITTIVITY-BASED PAPER SHREDDER CONTROL SYSTEM

CROSS-REFERENCE TO RELATED PATENTS AND APPLICATIONS

This U.S. patent application claims priority to, and is a Continuation-in-Part of, U.S. patent application Ser. No. 12/841,992, filed Jul. 22, 2010, which is a Continuation-in-Part of the parent U.S. application Ser. No. 12/576,493, filed on Oct. 9, 2009, which is a Continuation-In-Part of, U.S. application Ser. No. 11/827,798, now U.S. Pat. No. 7,622,831, entitled "Touch-Sensitive Paper Shredder Control System," filed on Jul. 12, 2007 and issued on Nov. 24, 2009, which is a Continuation-In-Part of U.S. application Ser. No. 11/468,851, now U.S. Pat. No. 7,471,017, which patent being filed on Aug. 30, 2006 and issued on Dec. 30, 2008, and also a foreign priority claim under 35 U.S.C. 119(b) is made to China Application No. CN200620043955.6, filed on Jul. 14, 2006, with aforementioned applications and patents being of the same inventor hereof, and being assigned to the same Assignee hereof, and with applications and patents being respectively incorporated by reference in their entirety.

BACKGROUND

1. Field of the Invention

The present utility model relates to the technical field of a paper shredder, particularly to control apparatus for a paper shredder, and more particularly, to a paper shredder controller.

2. Related Art

Automated office appliances have proliferated in modern life and workspaces, and one of the most common appliances are paper shredders. Currently, paper shredders, some of them with automatic safety sensors, have found widespread use in homes and businesses. Paper shredders have a narrow gap through which paper is fed to the shredder cutting apparatus. By design, the gap in a paper feed passage is limited in size, to protect a user or other party from inadvertently coming into contact with the shredder blade, or to protect the shredder blade apparatus by limiting the opening into which foreign matter may fall. During normal operation, a paper shredder motor, coupled to paper shredder blades, is turned on to cause the shredder blades to rotate relative to each other, and to comminute, or shred, the material therebetween. A sensor may be configured to detect an object inserted into a feed opening and to initiate shredder operation by energizing a shredder motor and by drawing in the object for comminution by shredder blades. A shredder may remain energized and ready for operation, unless turned off. Although convenient, an activated shredder in standby mode may present a risk of injury to a human or other living being. To that end, some sophisticated shredders may employ clever, elegant multisensor safety systems. Some current paper shredders do not have protective devices to prevent inappropriate objects or body parts of a living being from entering into the throat of the shredder posing an unacceptable safety hazard. In addition, overfeeding of a paper shredder can, over time, cause poor performance and may reduce its operational lifespan. Some overfeeding detectors can be mechanical features, which depend upon design for usefulness.

When excessive paper is pushed into the feed opening (an "overfeed"), a thick cluster, or a bolus, of paper may form in, and may block, paper feed passage. This bolus may be sufficient in mass to overload the shredder motor, bringing shredder operation to a halt (a "jam"). Both overfeed and jam conditions impose detrimental stresses upon a shredder motor and the power drive train from the motor to the shredder blades. Jam and overfeed conditions may prompt a human operator to attempt to "clear" the jam or overfeed, which increase a risk of harm to the operator. However, complex apparatus attempting to solve the problem tend to be unacceptably costly. There is a need for paper shredder feed opening safety apparatus, which can improve user safety at a lower cost.

SUMMARY OF THE INVENTION

The present invention solves the above-mentioned shortcomings by providing a permittivity-based paper shredder control system making use of a change of permittivity in a paper feed inlet. The control process is safe and sensitive. The circuit is stable in performance, and can be applied in a wide degree of situations. To meet the above objectives, a permittivity sensor for paper shredders is constructed as below.

The permittivity-based paper shredder control system may include a function module, power supply module, conductive touch panel, and a shredder mechanical component. The function module may include a touch detection circuit unit, motor reversal detection circuit unit, paper intake detection circuit unit, overload protection circuit unit, bioshield controller, and function switch having on, off, and reverse positions. All units in the function module may be connected directly to the bioshield controller except for the function switch, which, together with the bioshield controller, controls the motor driving circuit unit, and thus the shredder's mechanical components.

The power supply module may include an AC power interface switch, safety switch, fuse, control switch, power supply of bioshield controller, and motor driving circuit unit. The AC power interface switch, safety switch, fuse, and control switch may be connected in series and, through the control of the function switch, connect to the motor driving circuit unit. The control switch is a relay switch. The AC power, which flows through the fuse, is rectified, filtered and regulated to provide DC power to all circuit units.

The conductive touch panel may be connected to the touch detection circuit unit. The touch detection circuit unit consists of a bioelectricity controlled switching circuit and a ground switch circuit. The bioelectricity controlled switching circuit may be a transistor circuit with a first transistor where the touch panel is connected to the base of the first transistor via a first resistor. The base of the first transistor is also connected to ground via a parallel combination of a second resistor and a first capacitor. The emitter of the first transistor is connected to ground via a parallel combination of a third resistor and a second capacitor, and is also connected to the input of the ground switch circuit.

The collector of the first transistor drives in parallel, a power indicator LED and a touch indicator LED and is then connected to the power supply. The ground switching circuit is also a transistorized switching circuit having a second transistor. The base of the second transistor is connected to the output of the bioelectricity controlled switching circuit, the emitter is grounded, and the collector is connected to the input of the bioshield controller via an optical coupler and to the power supply via a fourth resistor.

The paper intake detection circuit unit also is connected to the bioshield controller. The paper intake detection circuit unit comprises a light emitting diode and a photosensitive diode. The emitting area of the former and the optics sensing part of the latter face each other and are installed on the walls of opposite sides of the feed throat. The overload protection circuit and the motor reversal detection circuit unit are connected to the bioshield controller.

The permittivity-based paper shredder control system has adopted cascaded circuits to ensure human safety when a human touches the conductive touch panel. The electricity from the human body enables the bioelectricity controlled switching circuit, and then all the connected circuits. The bioshield controller disables the mechanical part of the shredder and it ensures human safety. Even if the power switch is turned on, the mechanical part of the shredder still doesn't work. The shredder realizes real time monitoring. The complete control process is both safe and sensitive. The machine performance is stable and reliable and easy to operate without human oversight.

In other embodiments of the permittivity-based paper shredder control system, a shredder blade is configured to be sensitive to bioelectricity from a living being. When the bioelectricity is detected at the shredder blade, a control system responds by actuating a restraint to a shredder mechanical part, essentially halting a shredder blade. In yet other embodiments, the shredder motor is de-energized prior to actuating a restraint, reducing torque on driving and driven mechanical elements during deceleration of the shredder blade.

BRIEF DESCRIPTION OF THE DRAWINGS

The invention is generally shown by way of reference to the accompanying drawings, FIG. 1 through FIG. 32 in which.

The invention is generally shown by way of reference to the accompanying drawings in which.

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

DESCRIPTION OF THE EMBODIMENTS

Figure 1:
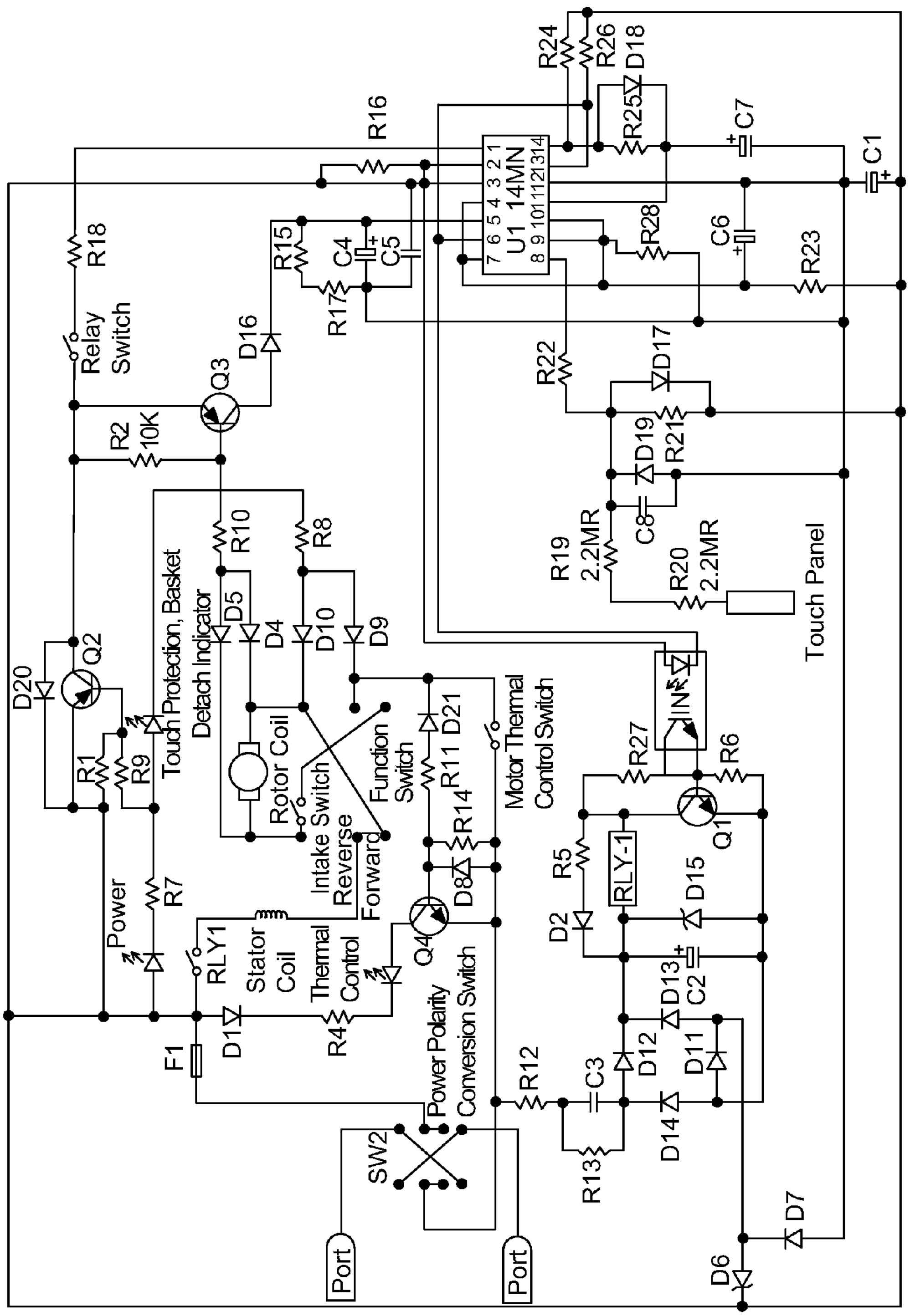
FIG. 1 is a circuit diagram illustrating the electrical components of a shredder control system using prior art technology.

Among the present day paper shredders, there have been shredders using the technology of contact detection to stop the shredder's blades from injuring a person or pet. Referring to FIG. 1, the circuit shown therein is an example of this technology. SW2 is a polarity conversion switch and it can exchange the hot lead and ground lead of the AC power. Resistors R12 and R13, capacitors C3 and C2, and diodes D11, D12, D13, D14, D15 and D6 comprise a 24V power supply for the relay. Diode D6, D7, and capacitor C1 comprise a power supply for U1, the voltage detection integrated circuit. The positive terminal of the power supply is the hot line of the AC power. Relay switch RLY-1, diode D2, transistor Q1, resistors R5, R27, and R6, and optical coupler U5 comprise a power supply for the equipment. Diodes D1, D8 and D21, thermal control lamp (orange), transistor Q4, resistors R4, R14, and R11, and motor thermal control switch comprise a thermal control indication circuit. Fuse F1, switch RLY1, motor, function switch, and motor thermal control switch comprise a motor operation circuit. The rotation direction is determined by the function switch setting. Power supply, resistors R7, R1, R9, R2, R8 and R10, diodes D20, D16, D4, D5, D9 and D10, transistors Q2 and Q3, and pin 5 of the voltage detection integrated circuit comprise a LED indication circuit. The metal part of the panel, resistors R20, R19, R21 and R22, capacitor C8, and diodes D19 and D17 comprise a touch detection circuit.

When the function switch is set at the "off" position, the machine is not working. When the function switch is set at other positions and the wastepaper basket is separated from the machine, the machine is on but not capable of cutting paper. When the basket is detached from the machine body, the spring switch is open to cut power to the motor. The operation of the circuit for the breaking of the spring is as follows: pin 1 of U1 detects the break of the spring, pin 5 of U1 becomes "high", Q3 and Q2 cutoff and the motor doesn't turn. The power indicator and touch/basket detach indicator are on because these two indicators, R7, R8, D9, and the motor thermal control switch form a current loop.

When the function switch is moved away from "off", and the wastepaper basket is in position, the machine is ready to work. The sequence of circuit operation is as follows: pin 1 of U1 becomes "low" and Q3 and Q2 become conducting. At the same time, pin 6 of U1 becomes "low", Q1 is on, and the relay RLY 1 is closed. Now if the function switch is set at "on", the machine will cut the paper if there is paper in the throat, otherwise the shredder is on standby. Under these circumstances, if hands, metal, or living animals contact the metal part at the feed throat, AC power, circuit elements (R21, R19, R20,) and the contact will form a circuit, and turn off the motor because pin 8 of U1 now is "low" and pin 5 and 6 of U1 are "high". To be more specific, as pin 6 of U1 is "high", Q1 is off and the motor power is turned off. As pin 5 of U1 is "high" and Q2 and Q3 are cut off, the touch protection indicator is on. After the contact is removed from the feed throat, the shredder returns to normal operation.

The touch protection is achieved through the installment of a permittivity sensor including a conductive touch panel at the paper intake. When touching the conductive panel, the conductivity of human body provides a faint signal to the control circuit to activate the touch protection. In this case, two 2.2 M ohm resistors largely decrease the current that flows through the human body and thus the circuit may not harm a human. By using this technique, a sensitive voltage detection integrated circuit is needed to monitor the status of the touch panel in real time. Thus the demand for a highly stable and sensitive integrated circuit is apparent. Circuit aging caused by long-term usage will also diminish or even cut the circuit's detection capability. As for the two resistors with high values, they limit the current that may flow through the human body, but they may also lose their capability in a humid environment. Moreover, a human may come in direct contact with AC power, causing electric shock or even endangering life.

Figure 2:
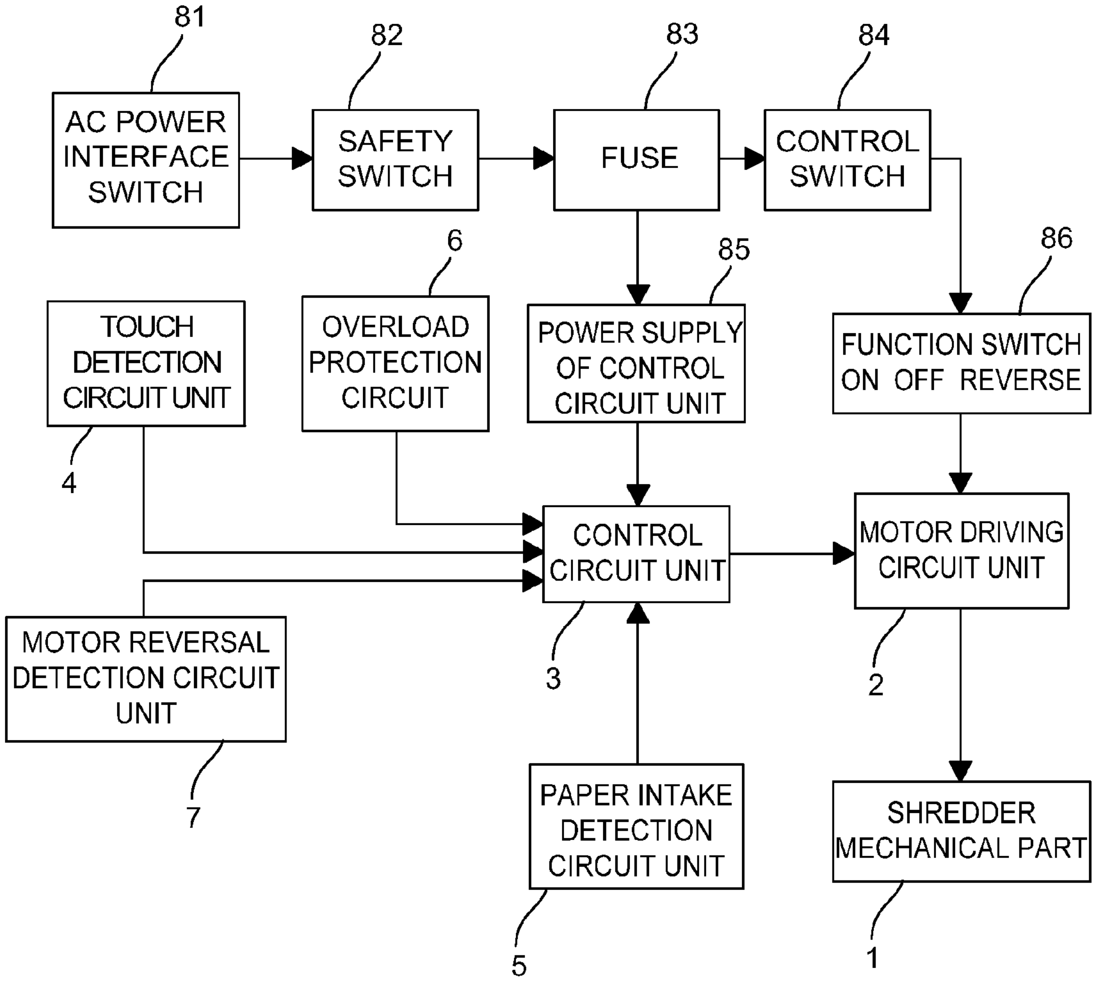
FIG. 2 is a block diagram of the components and modules within a touch-sensitive paper shredder control system of the present invention.

In one embodiment, the permittivity-based paper shredder control system may include the following components: a function module, a power supply module, and shredder mechanical parts. Referring to FIG. 2, the function module consists of a touch detection circuit unit 4, motor reversal detection circuit unit 7, paper intake detection circuit unit 5, overload protection circuit 6, controller 3, and function switch 86. All of these units are connected directly to controller 3 except for the function switch, which together with the controller controls the motor driving circuit unit 2, and then the shredder mechanical part 1. A conductive touch panel is connected to the touch detection circuit unit, which consists of a bioelectricity controlled switching circuit and a ground switching circuit.

The power supply module consists of an AC power interface unit 81, security switch 82, fuse 83, control switch 84, power supply of controller 85, and the motor driving circuit unit 2. The control switch is a relay switch, and the security switch is a door switch. The first four of the above-mentioned units are connected in series and, through the control of function switch 86, connected to motor driving circuit unit. The power, through the fuse, is connected to the power supply of controller, and then to the controller.

Figure 3:
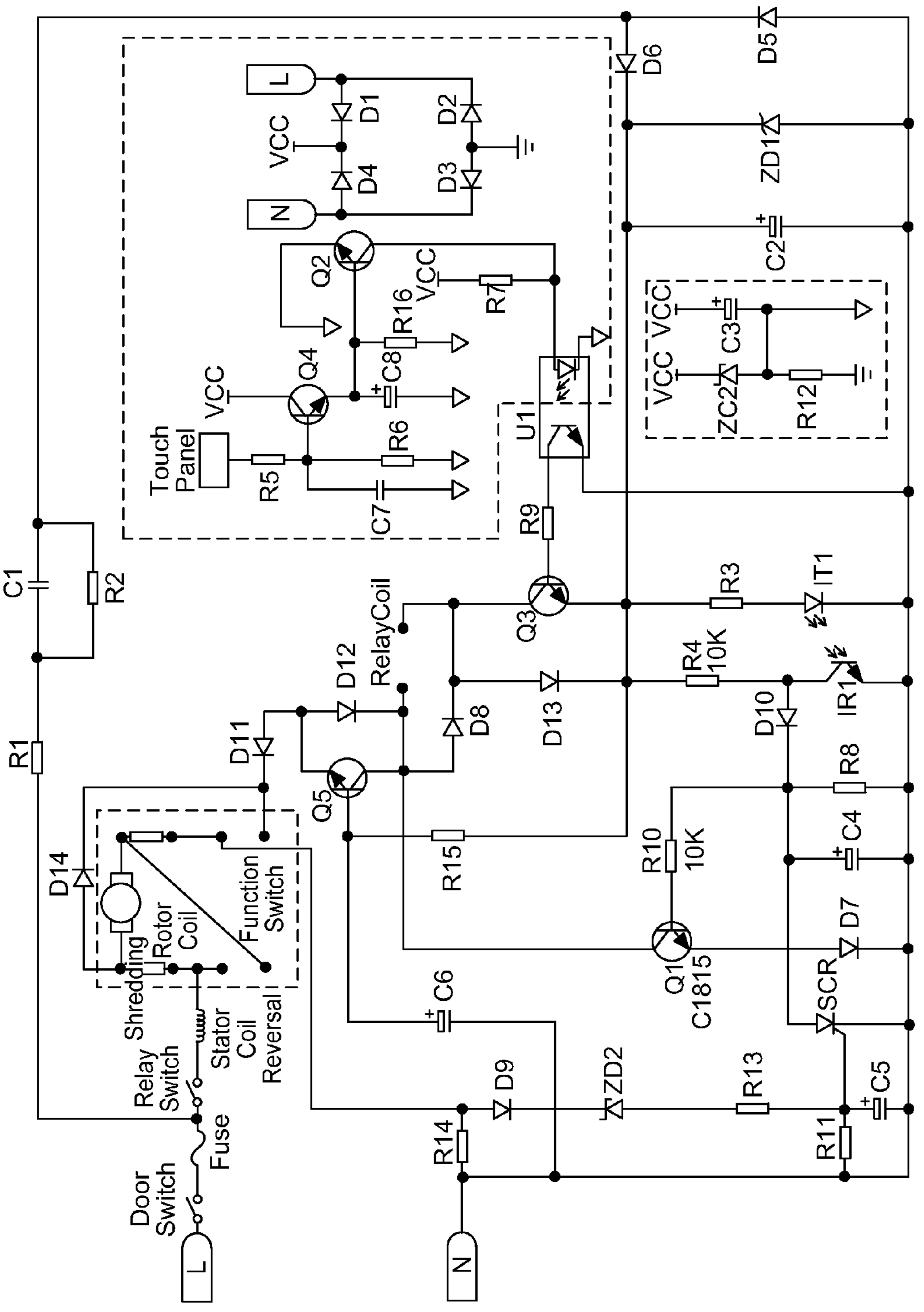
FIG. 3 is a circuit diagram of the electrical components of a touch-sensitive paper shredder control system of the present invention.

Turning to FIG. 3, in one embodiment, the bioelectricity controlled switching circuit is mainly a switching transistor circuit. The conductive touch panel is connected to the base of switching transistor Q4 via resistor R5. Transistor Q4 has its base connected to ground through paralleled capacitor C7 and resistor R6, its collector connected directly to power VCC, and its emitter connected to ground through paralleled capacitor C8 and resistor R16. The emitter of Q4 is also connected directly to the ground switching circuit.

The ground switching circuit is also a switching transistor circuit. The output from the bioelectricity controlled switching circuit is connected to the input of the ground switching circuit, i.e. the emitter of transistor Q2. Transistor Q2 has its emitter connected directly to ground, its collector connected to VCC through resistor R7, and its collector connected to the input of controller through an optical coupler U1.

Figure 4:
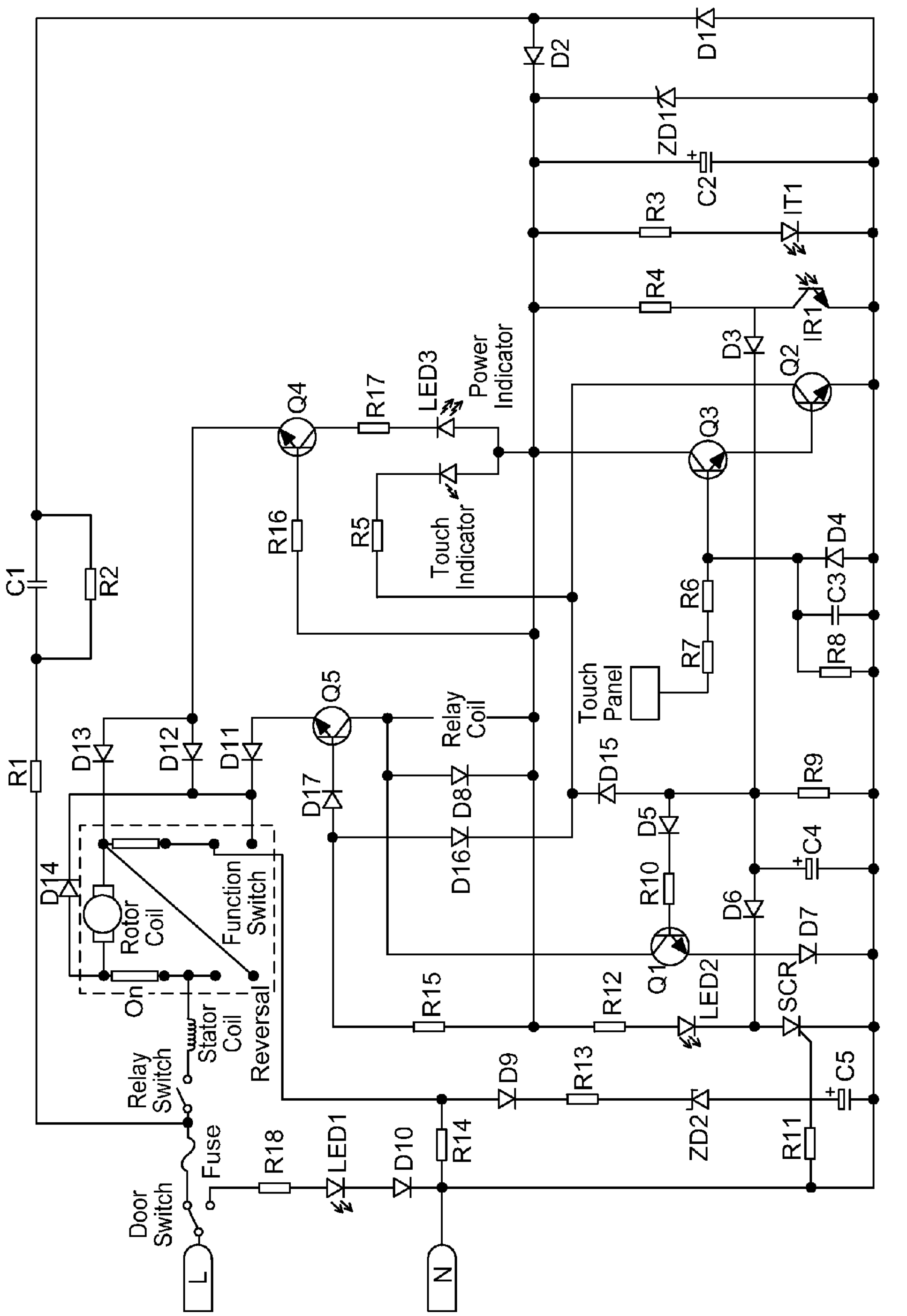
FIG. 4 is the circuit diagram of the electrical components of another embodiment of a touch-sensitive paper shredder control system of the present invention.

Referring to FIG. 4, in another embodiment a bioelectricity controlled switching circuit is based on transistor Q3. The touch panel is connected to the input of the bioelectricity controlled switching circuit, i.e. the base of the switching transistor Q3 through a serial combination of resistors R6 and R7. Transistor Q3 has its base connected to ground via a parallel combination of capacitor C3, diode D4, and resistor R8, the collector is connected to power supply VCC through a parallel combination of power indicator and touch indicator LED3, and the emitter is connected directly to the input of the ground switching circuit.

The ground switching circuit is also a transistor circuit. The output from the bioelectricity controlled switching circuit, i.e. the emitter of transistor Q3, is connected directly to the base of the switching transistor Q2. The emitter of transistor Q2 is connected directly to ground, and the collector is connected to the input of the controller 3.

Referring to FIG. 2 the paper intake detection circuit unit is connected to the controller 3. Now turning to FIG. 3, the paper intake detection circuit unit consists of a light emitting diode IT1, and a photosensitive diode IR1 which face each other on opposite positions on the wall of the feed throat of the shredder. Both the overload protection circuit unit 6 and the motor reverse detection circuit unit 7 are connected to the controller 3 of the permittivity-based paper shredder.

Referring back to FIG. 2, both the motor reversal detection unit 7 and the paper intake detection unit 5 are connected to controller 3, then the motor driving circuit unit 2, and then to the shredder mechanical part 1. The motor reversal detection unit 7 detects the reversal signal, sends the electric signal to the controller 3, then electrically controls the shredder mechanical part 1 to reverse the motor direction through motor driving circuit unit 2. The paper intake detection circuit unit 5 detects the paper insertion at the feed throat, sends the signal to the controller, and then drives the shredder mechanical part to cut the paper through motor driving circuit unit.

Figure 5:
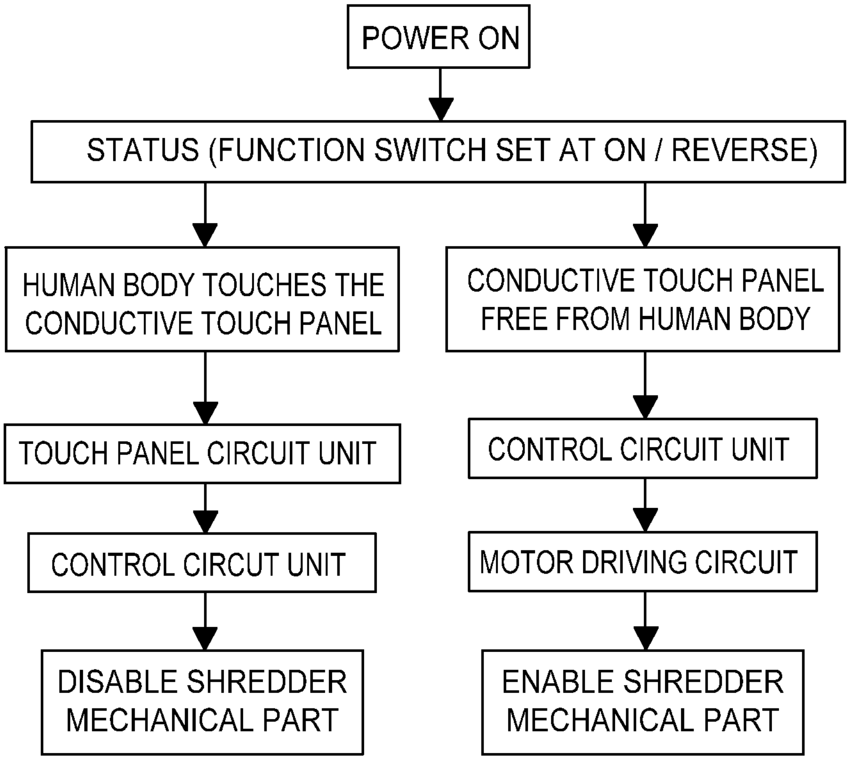
FIG. 5 is a flow chart of the control process used in connection with a touch-sensitive paper shredder control system of the present invention.

Referring now to FIG. 5, during the paper shredding process, if a human body touches the touch panel of the feed throat, the shredder will stop immediately. The touch signal is sent to touch detection circuit unit 4, then goes to controller 3, and stops the shredder by cutting the power to motor driving circuit unit 2. If a human body doesn't touch the conductive touch panel, the controller will release the control to motor driving circuit unit 2 to allow the mechanical part to work independently.

Referring back to FIG. 3, the shredder has the following features: overload protection; optics controlled shredding; shredding, shutdown, and reversed rotation functions; and automatic touch-stop.

The power supply of the controller is described below. AC input power is divided, rectified, regulated, and filtered by the circuit consists of resistors R1 and R2, capacitors C1 and C2, diodes D5 and D6, and Zener diode ZD1. The regulated 24 volts DC power is the power source for the controller. It's far below the safety voltage to pass through human body and will do no harm to human or animals.

The power supply for the touch detection circuit unit is described below. The AC input power, going through a bridge rectifier, is regulated and filtered to provide 12 volts DC voltage. The circuits consists of diodes D1-D4, Zener diode ZD2, resistor R12 and capacitor C3.

When a human touches the metal panel, the bioelectricity from the human body goes to the base of the transistor Q4 via a 1 megaOhm resistor. The bioelectricity triggers transistors Q4 and Q2 on, cuts off transistor Q3, and thus cuts the motor power so that the shredder automatically stops when people touch the feed throat.

Referring now to FIG. 4, the shredder in this embodiment has the following features: on-off LED indicator; touch protection LED indicator; overload LED indicator; AC Power indicator; optics controlled shredding; and shredding, shutdown, and reversed rotation function.

The overload protection and door open LED indicating functions are implemented by the circuit consists of R18, R14, R13, R11, and R12, light emitting diodes LED1 and LED2, diodes D10, D9, and D6, Zener diode ZD2, capacitor C5 and silicon controlled rectifier SCR.

The power supply for the controller includes a circuit consisting of resistors R1 and R2, capacitors C1 and C2, diodes D1 and D2, Zener diode ZD1, and capacitor C2. The same regulated 24 volts DC power is used as the power source for the controller. It's far below the safety voltage to pass through a human body and will do no harm to human or animals.

The touching function is described below. When human touches the metal panel, the bioelectricity from a human body goes to the base of the transistor Q3 via resistors R6 and R7. The signal triggers Q3 and Q2 on, turns Q1 off, and cuts the power to the motor. The motor stops turning and people are protected. The touch detection circuit unit will be more stable if it uses an independent bridge power supply, and is isolated from the motor by an optical coupler.

When a human touches the panel, the touch of human on the metal part of the panel provides a triggering signal which via base bias circuit, turns Q3 on. The base bias circuit consists of resistors R7, R6 and R8, diode D4, and capacitor C3. With enough forward voltage from a human Q3 and Q2 are both turned on. When Q2 is on, its collector voltage drops and thus it turns on touch indicator via R5, turns off Q5 via D16, and turns off Q1 via D15. If the machine were turning reversely at this moment, Q5 would be on. But because of the touch voltage, Q5 is turned off and so is the motor. The other situation is when the machine is in a shredding state. In this case Q1 would be on to turn the motor in the forward direction. But because of human touch Q1 is turned off and motor is turned off, too. In either case, the machine is shut off to ensure the safety of human.

When a human no longer touches the machine's metal plate, transistor Q3 turns off because there is no trigger voltage and the machine returns to a normal working state. The working principle of the power on indicating circuit is as below. When the machine is in the shredding or reversal state as selected from the function switch, the power on indicator in on and when the machine is in a stopped state, the indicator is off. The indicator circuit includes an indicator lamp, resistors R17 and R16, and transistor Q4. When the machine is in the stop state, the indicator is off because transistor Q4 is not conducting. As for the reversal state, the emitter junction of transistor Q4, diode D12, and function switch complete a circuit and the power on indicator is on. While the machine is in the shredding state, the emitter of Q4, diode D13, and the function switch complete a circuit and the power indicator is on.

Persons with small hands, in particular, toddlers, may have fingers that are capable of circumventing mechanical safety systems of a paper shredder. Accordingly, embodiments of the present invention can encompass a paper shredder safety system that is substantially activated by shredder blade contact. Unlike proximity detectors, which actuate safety measures when a target comes with a predetermined distance of a shredder housing element, a shredder blade contact safety system described here is actuated by target contact with a shredder blade.

In general, when a permittivity-based shredder blade control system is actuated by shredder blade contact, power is removed from the shredder motor. A biosensor is a sensor which, when in contact with a living being receives a biological signal, e.g., bioelectric signal, from a living being, causing an effect. In particular, when a living being contacts the shredder blade, the bioelectric signal generated by the living being is sensed by a biosensor coupled to a shredder blade, i.e., a biosafety blade. The bioelectric signal received by the biosafety blade produces a biosignal which actuates a bioshield controller to cause a safety stop, in which at least the shredder motor is de-energized.

Figure 6:
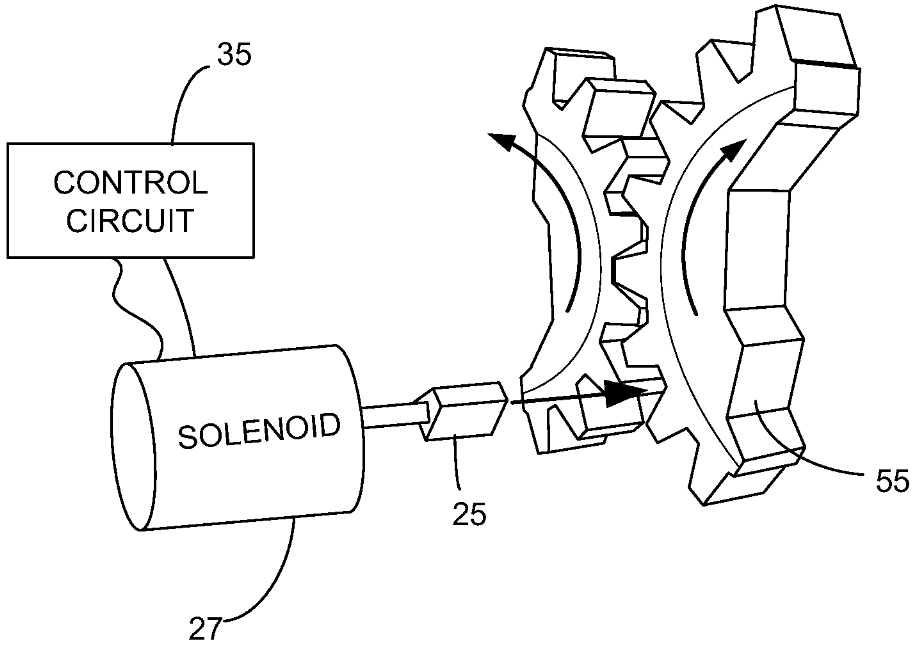
FIG. 6 is an illustration of an embodiment of an apparatus to stop the shredder gears from turning.

Turning to FIG. 6, yet other embodiments of the invention herein are illustrated. Control circuit 35 can actuate fast-acting solenoid 27 to deploy mechanical power restraint 25, which restrains the rotation of the shredder blades. For example, restraint 25 may be positioned proximate to a motive element of the power transmission system between motor and blades, such as the meshing gears represented at reference 55, which gears are synchronized with the rotation of the shredder blades.

When actuated and deployed, restraint 25 may engage a driving gear, a driven gear, or both. Upon contact with a shredder blade, the user bioelectric signal causes restraint 25 to be deployed between the meshing gear teeth 55 of a driving gear and a driven gear, rapidly decelerating and stopping the blades of the shredder. It is desirable that restraint 25 be constituted to absorb the residual rotational momentum force of the shredder blades, of a durable, resilient, wear-resistant, and shock absorbent material, such as, without limitation, high density polyethylene, although other material, such as a hardened natural rubber, also may be suitable. Materials for restraint 25 are preferred to be generally inexpensive and unlikely to damage meshing gear teeth 55. Restraint 25 can be in the form of a rubber chock, which can be mounted onto a quick-acting solenoid 27 for rapid, affirmative setting of restraint 25. The chock can be constituted of a durable, resilient, wear-resistant, and shock absorbent material, for example, a rubber material.

Typically, solenoid 27 could be in the form of a push-type solenoid, actuated by control circuit 35 in response to the bioelectric signal emanating from a living being in contact with shredder blade. Prior to deployment of restraint 25, the shredder motor can be deactivated, after which solenoid 27 can be actuated, thus interposing chock 25 between meshing gears 55 to effect a rapid, "soft stop." A "soft stop" significantly reduces the likelihood that neither meshing gears or other mechanical power transmission system elements, nor the user contacting the shredder blade, will experience traumatic contact with the shredder blade.

Other embodiments can employ a clutch as mechanical power restraint 25 to stop the moving shredder gears, and thus, blades. For example, the clutch can disengage a gear from a rod connected to the gear thereby causing the rod to stop turning due to the frictional forces associated with the blade interactions. Another clutch example could be a clutch between the motor and a gear box that would disengage the torque delivered by the motor. Yet another embodiment could include a circuit that reverses the current flow to the motor to a degree that counteracts the direction of movement by the motor thereby causing a type of electromagnetic braking. Such a system may produce very little, if any, reverse direction by the motor.

Figure 7:
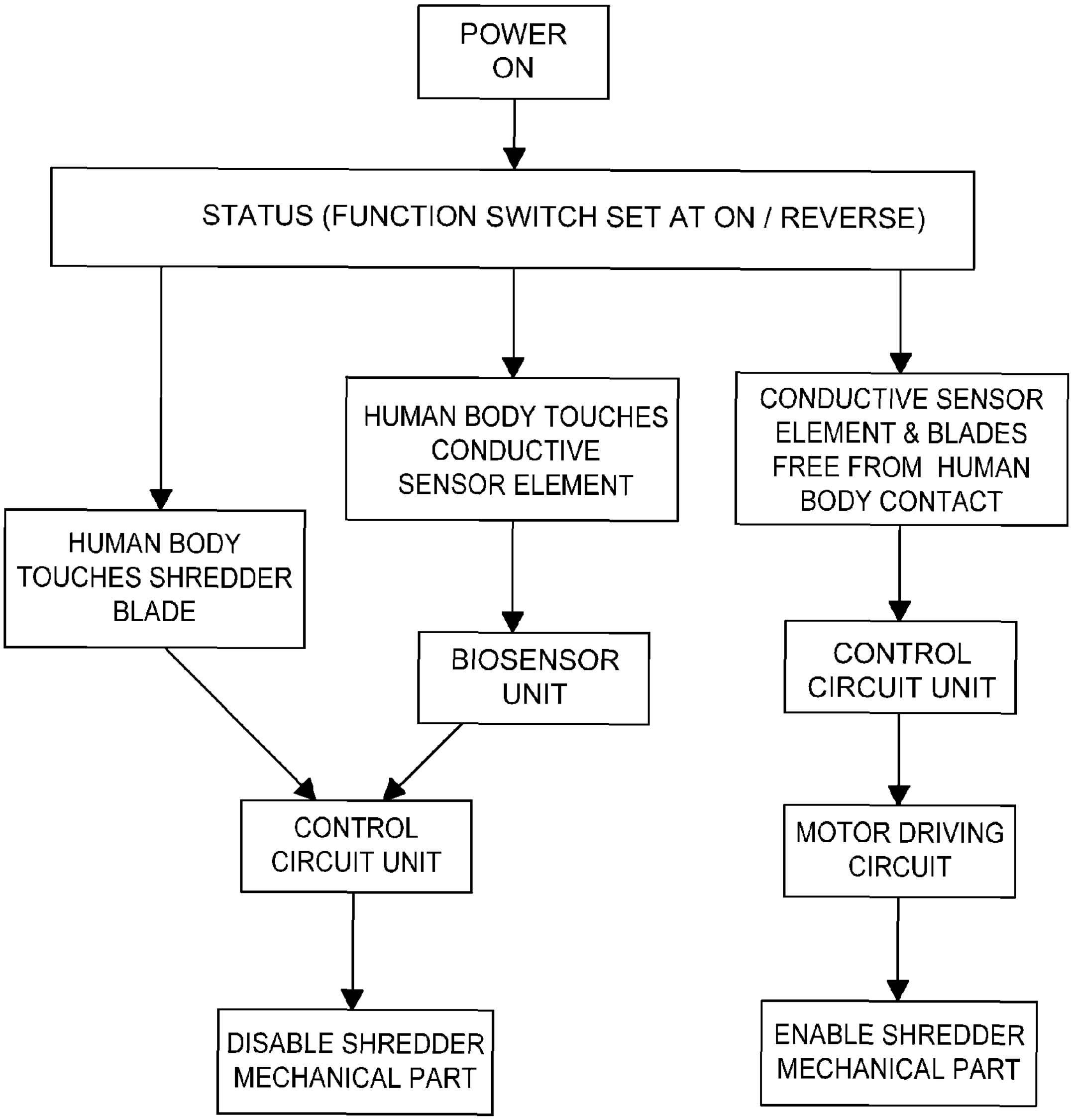
FIG. 7 is a flow chart illustrating the operation of an embodiment of the invention.

FIG. 7 illustrates a dual-phase method 700 of operating a permittivity-based paper shredder control system. In a first phase, paper shredder provides a first sensor response in a first sensing process. In a second phase, paper shredder provides a second sensor response in a second sensing process. In embodiments herein, a first phase can be constituted of a shredder blade sensor sensing contact with a living being by receiving bioelectricity (a "bioelectric signal") from the living being in a manner indicating contact. A second phase can be constituted of a conductive touch panel sensing contact with a living being by receiving a bioelectric signal from the living being in a manner indicating contact. In certain embodiments, the first phase process can include coupling the bioelectric signal to the bioshield controller. In response, the bioshield controller can de-energize the paper shredder motor and deploy a restrainer into the mechanical power transmission system, bringing the shredder blades to a rapid and complete stop. Similarly, the second phase process can include coupling a bioelectric signal applied to the conductive panel to the touch panel unit which, in turn, couples a representation of the bioelectric signal to the bioshield controller. In response, the bioshield controller can de-energize the paper shredder motor, causing the shredder blades to stop.

In other embodiments, a single phase stop can be provided by the first sensing process, in which a shredder blade sensor senses contact with a living being by receiving a bioelectric signal from the living being in a manner indicating contact. A representation of the bioelectric signal then can be coupled to the bioshield controller. In response, the bioshield controller can de-energize the paper shredder motor and deploy a restrainer into the mechanical power transmission system, bringing the shredder blades to a rapid and complete stop.

Figure 8:
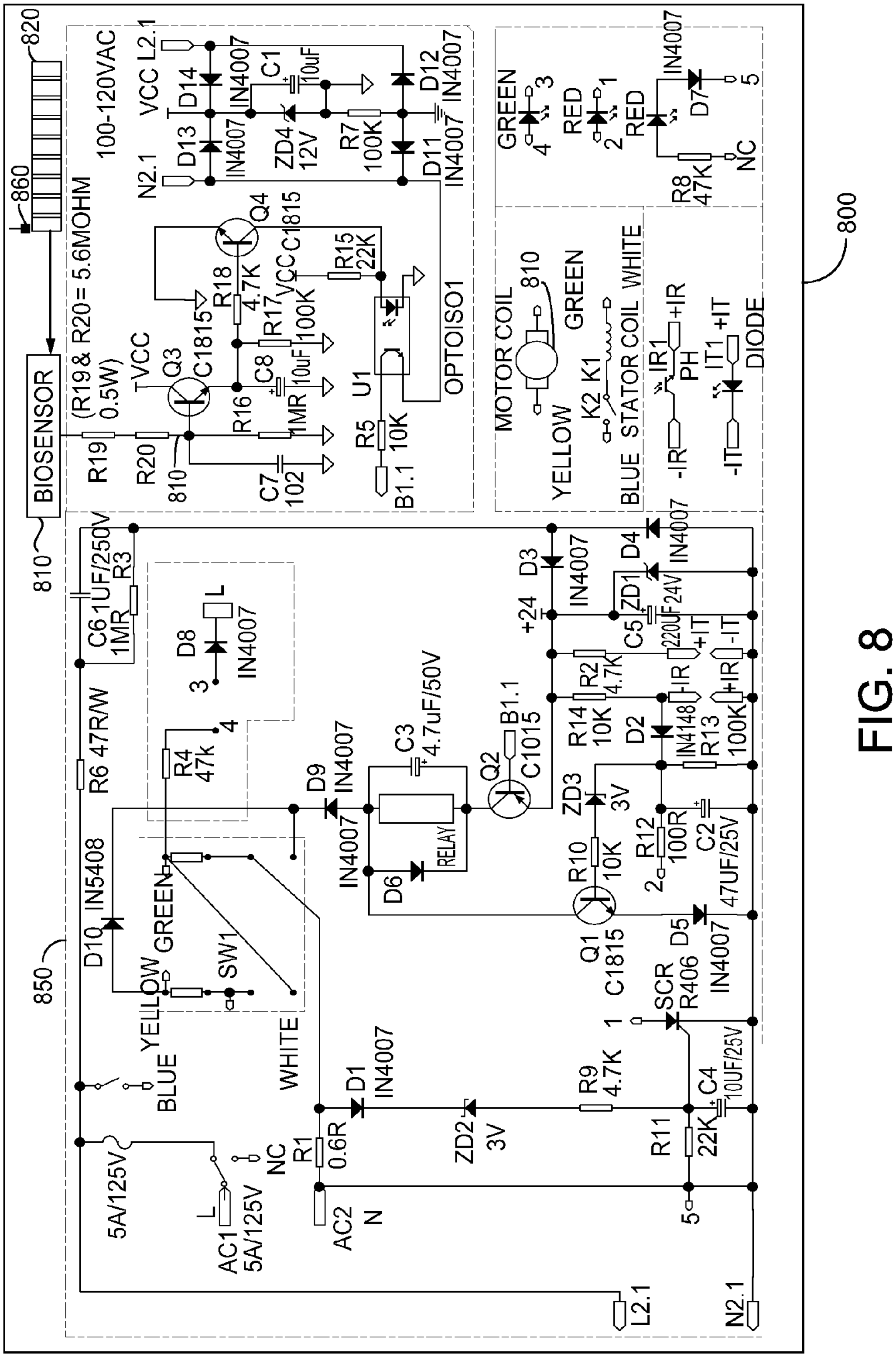
FIG. 8 is a circuit diagram of the electrical components of an embodiment of a touch-sensitive paper shredder blade control system, in accordance with the teachings of the present invention.

FIG. 8 is a circuit diagram illustrating an example embodiment of a permittivity-based shredder blade control circuit 800. Although FIG. 8 shares some functional similarities with the touch panel-related control circuit of FIG. 3, it will be appreciated by one skilled in the art that permittivity-based shredder blade control circuit 800 in FIG. 8 is distinct from the circuit of FIG. 3, most notably in the adaptation of touch control system 810 to be sensitive to bioelectricity received from a living being and sensed at shredder blade 820.

In response to the sensed touch of a metal shredder blade by a living being, touch control system 810 can produce a signal 825 representative of the sensed bioelectricity by activation (ON) of cascaded transistors Q3 and Q4. Biosignal 825 can be coupled to Q2 of main control circuit 850 by way of an optoelectric coupler OPTO1. OPTO1 may further isolate the living being touching shredder blade 820 from the potentially lethal electric power being used to actuate motor 840. Transistor Q2 can, operate as a switch, and when a representation of a biosignal is received from OPTO1, Q2 can be configured to turn OFF, actuating electromechanical restraint element 860. Electromechanical restraint element 860 can include a relay coil, which can de-energize motor 840, when Q2 is turned OFF. In addition, electromechanical restraint element 860 may include a solenoid coupled to a mechanical power transmission restraint.

In the context of FIG. 6, a non-limiting example of a solenoid coupled to a mechanical power transmission restraint may be solenoid 27 coupled to mechanical power transmission restraint 25. When Q2 is turned OFF, the solenoid can de-energize, causing mechanical power transmission restraint 25 to be driven into the mechanical power transmission elements, such as meshing gears 55. Alternatively, another non-limiting example of a mechanical power transmission restraint may be a clutch coupled to electromechanical restraint element 860. In yet another non-limiting alternative, mechanical power transmission restraint 25 may be implemented using a chock and a clutch, where electromechanical redundancy is elected.

Figure 9:
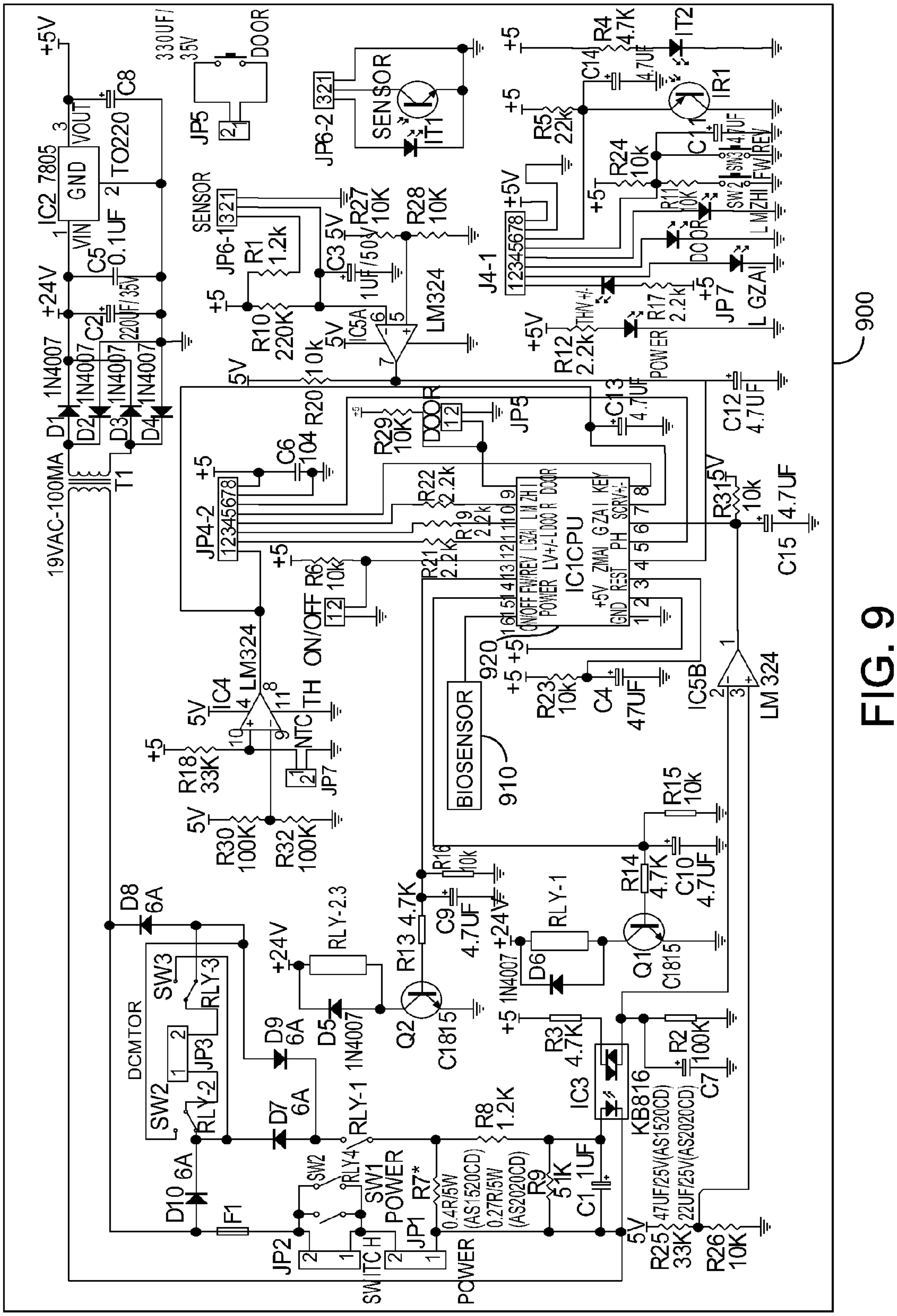
FIG. 9 is a circuit diagram of the electrical components of another embodiment of a touch-sensitive paper shredder blade control system, in accordance with the teachings of the present invention.

FIG. 9 is a circuit diagram illustrating another example embodiment of a permittivity-based shredder blade control circuit 900. Blade touch sensor 910 can be coupled to an integrated circuit IC1 920, for example, at PIN 16. A biosignal received from blade biosensor 910 is received on PIN 16 which, in turn, deactivates or sets a LOW power signal on PIN 15. The LOW power signal is received by NPN transistor Q1, which turns OFF in response to the LOW signal, causing motor 930 to be de-energized. In addition, it may be possible to configure IC1 920 to provide a HIGH signal on PIN 14 (Motor Forward/Reverse). A HIGH signal from PIN 14 can be coupled to turn ON NPN transistor Q2 a reverse motion in motor 930, at least long enough to perform electrical braking of the shredder blade. In addition, transistor Q2 and relay RLY-2.3 may be elements of an electromechanical restraint element, which also may include a chock mechanical restraint, a clutch mechanical restraint, or both.

In other embodiments of the present invention, a standoff biosensor having a metalized contact element can be connected to an inner portion of a shredder assembly other than a shredder blade. When a living being contacts the metalized contact, the standoff biosensor actuates a bioshield controller to cause a safety stop. A safety stop can be characterized by de-energization of the shredder motor moving in the forward (shredding) direction. Also, in a safety stop, a restraint may be deployed to substantially immediately stop motion of the shredder blades. Further, in a safety stop the shredder motor can be momentarily energized in the reverse direction to cause electromotive braking of the shredder blade.

Figure 10:
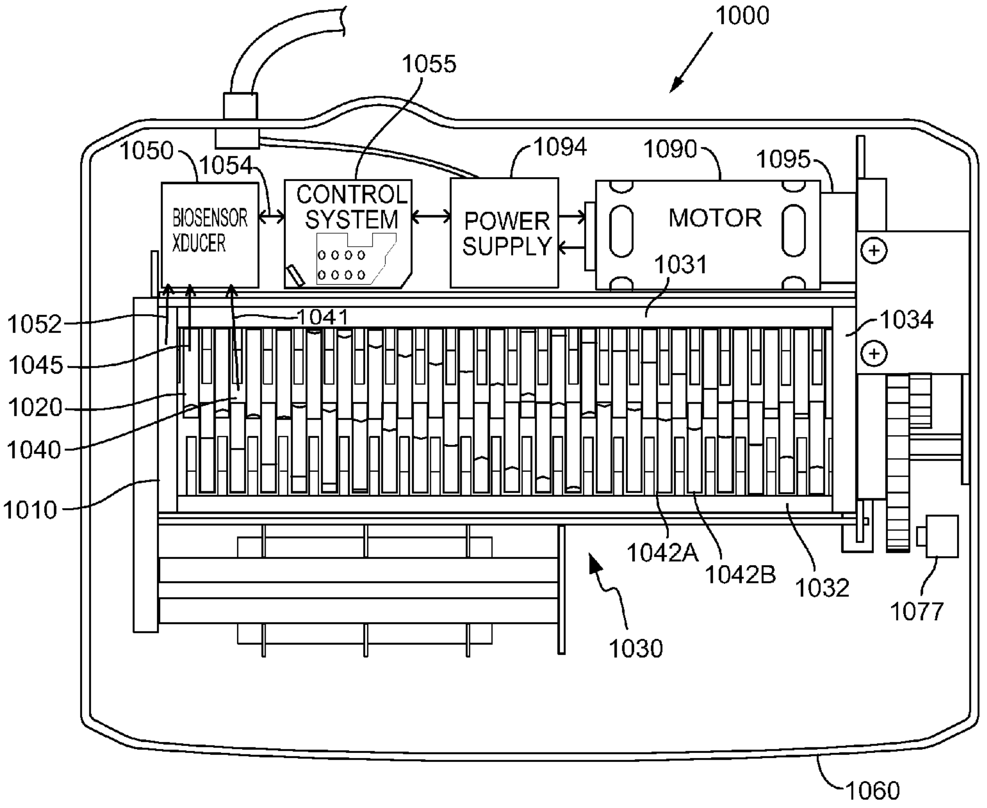
FIG. 10 is a top plan view of yet another embodiment of a touch-sensitive paper shredder control system, in accordance with the teachings of the present invention.

Turning to FIG. 10, shredder assembly (for convenience, “shredder”) 1000 may be configured with inner housing 1010 in which shredder blade 1020 can be disposed. Inner housing 1010 of shredder 1000 can include a frame, generally at 1030, at least partially surrounding blade 1020. Support frame 1030 may include one or more generally horizontal support frame members, for example, member 1032 and one or more generally vertical frame members, for example member 1034, (with “horizontal” being oriented in parallel with a longitudinal axis of shredder blade 1020.

In selected ones of the non-limiting example embodiment of shredder 1000, at least a portion of at least one member of support frame 1030 can be metalized, forming a metalized contact element. The metalized contact element can be a portion of the metalized frame member. In certain selected embodiments, support frame 1030 can be constituted of conductive metal members, such that essentially the entire support frame can be a metalized contact. Metalized support frame 1030 can be supported on shredder lower housing 1060. Frame 1030 can provide improved structural support for the shredder blade 1020 within shredder 1000 and, perhaps, for shredder motor 1090 and mechanical power transmission, represented by motor driver shaft 1095. One or more biosensor elements may be disposed proximate to, or on, support frame 1030 which forms a blade caddy. A blade caddy may include at least one or more of shredder blade 1020, support frame 1030, including one or both of frame members 1032 or 1034, metalized spacers 1040, transducer 1050, or lower housing 1060. Upon receiving a bioelectric signal from a living being, the blade caddy can cause biosignal 1054 to be transmitted to the control system (bioshield controller) 1055, to de-energize shredder power.

In general, the metalized contact element, such as represented by support frame member 1032 or 1034, stands off from (i.e., is not in contact with) shredder blade and may be interposed between an inlet to the shredder blade (in an upper housing, not shown) and shredder blade 1020 itself. Typically, the metalized contact element 1032 is coupled to a transducer 1050, which receives bioelectric signal 1052 from a living being (not shown) in contact with the metalized contact element 1032, and which produces a representation 1054 of the bioelectric signal. Metalized contact element 1032 coupled to transducer 1050 can be described as a standoff biosensor (in combination, standoff biosensor 1051) and a representation 1054 of the bioelectric signal can be described as a biosignal. Standoff biosensor 1051 can be actuated to couple biosignal 1054 to bioshield controller 1055. Standoff biosensor 1051 can be used to sense the proximate contact of a living being (not shown) relative to shredder blade 1020, without the living being making contact with shredder blade 1020.

In response to standoff biosensor 1051 detecting proximate contact, bioshield controller 1055 can effect a safety stop, bringing shredder blades 1020 to a rapid and complete stop. During a safety stop bioshield controller 1055 de-energizes power supply 1094 of paper shredder motor 1090, may deploy an aforementioned restraint into the mechanical power transmission system 1095, or both. In embodiments in which reverse motor motion is permitted, bioshield controller 1055 may momentarily energize paper shredder motor 1090 in a reverse direction to cause electromotive braking, which may further and more quickly reduce inertial shredder blade motion in the forward direction.

In non-limiting alternative example embodiments, also depicted in FIG. 10, a metalized contact element can be a segment, a strip, or a generally circumferential ring disposed in the shredder, set apart from and generally superior to the shredder blade 1020, relative to direction of feed into the paper shredder blade 1020. The form of the metalized contact element may be continuous or interrupted. As illustrated in FIG. 10, non-limiting embodiments of a metalized contact in the form of a strip may include metalized interblade spacer 1040, which can be disposed between adjacent shedder blade elements 1042A, 1042B. One or more of metalized interblade spacers 1040 may be coupled to transducer 1050, such that transducer 1050 can receive bioelectric signal 1041 from metalized interblade spacer 1040, when in contact with a living being (not shown). Typically, interblade spacer 1040 is configured with a spacer contact surface positioned in a stand off posture, relative to and apart from, adjacent shedder blade elements (for clarity, blade elements 1042A and 1042B).

In such an embodiment, a living being coming into contact with metalized element 1040 can actuate biosensor transducer 1050 to transmit biosignal 1054 to bioshield controller 1055. In turn, bioshield controller 1055 can perform a safety stop by de-energizing power supply 1094, and removing power from paper shredder motor 1090. During the safety stop, bioshield controller 1055 also may deploy an aforementioned restraint into the mechanical power transmission system 1095 bringing shredder blades 1020 to a rapid and complete stop. Where shredder motor 1090 is configured for reverse motion, bioshield controller 1055 can cause electromotive braking by energizing motor 1090 to turn in reverse direction. In some embodiments where electromotive braking is used, bioshield controller 1055 may deploy an aforementioned restraint generally concurrently with a momentary electromotive braking of sufficient duration to bringing shredder blades 1020 to a rapid and complete stop.

In a first non-limiting example, plural metalized members of support frame 1010 can be electrically coupled to each other as well as to transducer 1050, so that bioshield controller 1055 may cause a safety stop in response to contact between a living being and a coupled surface of frame 1030. In a second non-limiting example, multiple ones of metalized spacers 1040 can be electrically coupled to transducer 1050, so that control system (bioshield controller) 1055 may cause a safety stop in response to contact between a living being and one of metalized spacers 1040. In a third non-limiting example, plural metalized members of support frame 1010 and multiple ones of metalized spacers 1040 can be electrically coupled to transducer 1050, so that control system 1055 may cause a safety stop in response to contact between a living being and at least one of a metalized member, a metalized spacer, or both. In a fourth non-limiting example, bioshield controller 1055 may be configured to control the functions of the shredder, e.g., motor power, overheat, or jam, to be activated by a sentinel switch, to remain selectively activated during a predetermined activity period, or to momentarily reverse motor movement if a bioelectric signal is received or an “UNJAM” actuator is energized.

Figure 11:
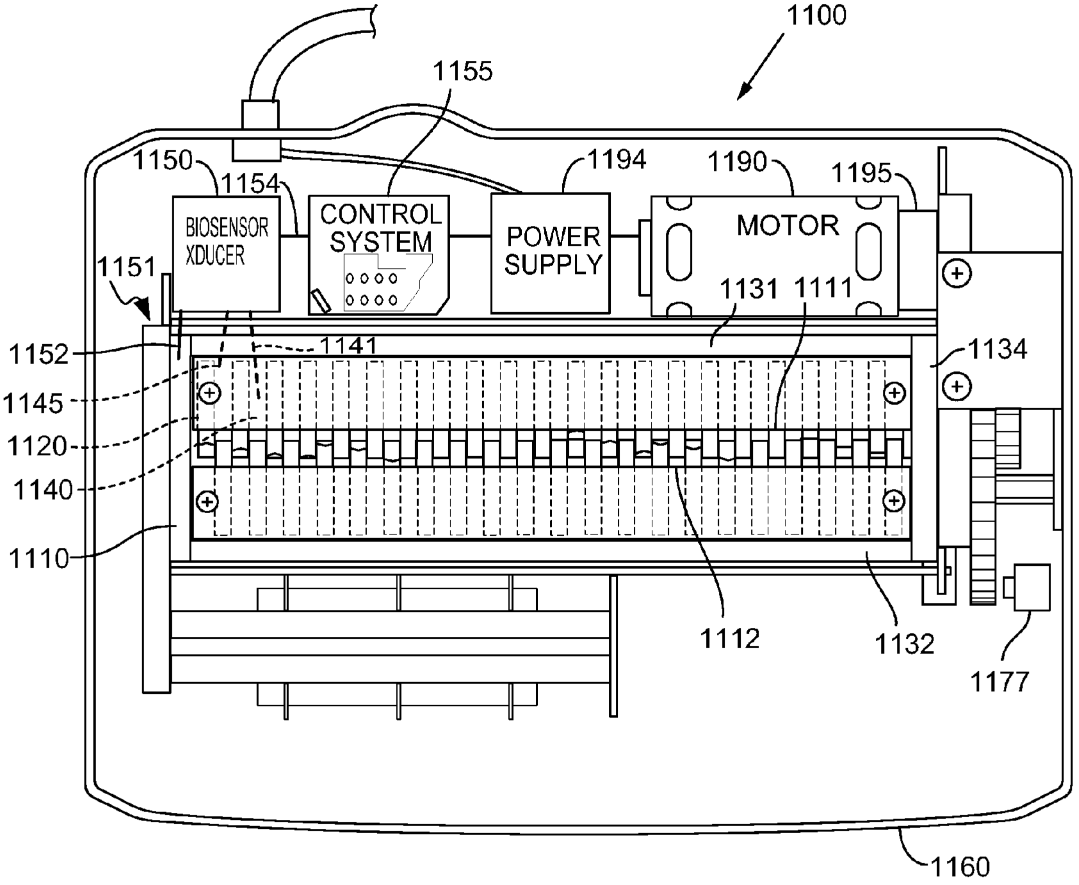
FIG. 11 is a top plan view of still another embodiment of a touch-sensitive paper shredder control system, in accordance with the teachings of the present invention.

FIG. 11 illustrates a top view of shredder assembly 1100, with a vantage similar to shredder 1000 in FIG. 10. In selected other non-limiting example embodiments according to the present invention, shredder frame (generally at 1110) can be coupled to blade shield 1111, 1112 with individual blade shield members 1111 and 1112 being set apart by a predetermined shield gap 1115, relative to the longitudinal axis of shredder blades 1120. Predetermined shield gap 1115 can be sized to limit access of material to be shredded to the region encompassed within shield gap 1115. Blade shield members 1111 and 1112 can be positioned above, and set apart from shredder blades 1120. Typically, shield gap 1115 can be disposed beneath, and longitudinally aligned with a feed opening (not shown) of shredder 1100. Shield gap 1115 stands off sufficiently from blades 1120 to allow expected normal operation of paper shredder 1100 to proceed, but to limit access to shredder blades 1120 and their immediate, and hazardous, environs.

One or both of blade shields 1111, 1112 may be electrically coupled to biosensor transducer 1150, forming in combination biosensor 1151. Blade shield 1111, 1112 receive bioelectric signal 1141 transmitted from a living being in contact with electrically coupled blade shield 1111, 1112, and can transmit bioelectric signal 1141 to transducer 1150. In response, transducer 1150 can generate biosignal 1130, which can be received by bioshield controller 1155. When a biosignal 1130 is received by bioshield controller 1155, bioshield controller 1155 can respond by effecting a safety stop. Similar to a safety stop corresponding to shredder 1000 in FIG. 10, bioshield controller 1155 can respond to biosignal 1130 by de-energizing power supply 1160 and, in turn, removing power from shredder motor 1190, bringing shredder blades 1120 to a rapid and complete stop. In some embodiments, a safety stop caused by bioshield controller 1155 also may deploy an aforementioned restraint into the mechanical power transmission system 1195. As with shredder 1000 in FIG. 10, a safety stop caused by bioshield controller 1155 also may perform electromotive braking to reduce inertial movement of shredder blades 1120.

Blade shield 1111, 1112 can improve structural strength and integrity of shredder 1100, and also provide enhanced product reliability, extended product service life, and reduced operational costs. Further, shield gap 1115 between blade shields 1111, 1112 may be adjusted in width such that the shield gap 1115 may approximately the same as a proximate, corresponding gap in a paper feed inlet opening (not shown) for shredder 1100. Also, shield gap 1115 may be disposed approximately equal to a proximate, corresponding gap in a paper feed inlet opening (not shown) for shredder 1100. In addition, shield gap 1115 may be disposed to be slightly narrower than proximate, corresponding gap in a paper feed inlet opening (not shown) for shredder 1100, while not impairing material being fed into blades 1120. In an example embodiment in which shield gap 1115 is slightly narrower than a proximate, corresponding gap in a paper feed inlet opening (not shown) for shredder 1100, touch contact between a living being and metalized contact sensor 1111, 1112 of biosensor 1151 can be more likely to cause a safety stop before the living being comes into contact with shredder blades 1120. Such an arrangement can enhance safety aspects of shredder 1100, even in environment where living beings are prone to direct probing of shredder 1100 internal mechanisms, or are engaged in maintenance or in testing of an energized shredder 1100.

In yet other alternative embodiments, safety stop apparatus and methods described relative to shredder 1000 in FIG. 10, and shredder 1100 in FIG. 11, may be used alone or in combination. In a fourth non-limiting example, touch contact between a living being and a blade shield 1111 electrically coupled to transducer 1150, can cause bioshield controller 1155 to perform a safety stop. Moreover, such blade shield embodiments of FIG. 11 also may be used in conjunction with one or more of non-limiting examples described with respect to FIG. 10. In a fifth non-limiting example, contact between a living being and one or more of a metalized member of frame 1010 or a metalized spacer, and one or more blade shield 1111, 1112 which can be electrically coupled to a transducer 1050 or 1150, causing bioshield controller 1055 or 1155 to perform a safety stop. Further, any of the foregoing non-limiting examples may be modified so that contact sensing by shredder blade 1020 or 1120, and by one or more of metalized frame members, metalized interblade spacers, or blade shield can cause a bioshield controller such as units 1055 or 1155, to perform a safety stop.

In addition, embodiments of the present invention can provide an inexpensive, reliable, and convenient solution to potential hazard and safety problems arising from an attempt to overfeed a paper shredder feed inlet or opening, or to insert an inappropriate object or part of a living being accidentally, or in an attempt to “clear” an overfeed or jam condition. In accordance with the following description, certain embodiments of a safety inlet apparatus for paper shredder can be realized, inter alia, using a permittivity-based sensor coupled to that paper feed inlet of a shredder, which apparatus also may include an aforementioned touch-sensitive safety feature.

Where the shreddant batch is a heterogenous stack of papers, determination of the permittivity for that sample of shreddant can become complex, for example, because individual papers may exhibit idiosyncratic values for density, moisture content, grammage, or basis weight; because adjacent sheets of paper may be disposed differently from others; and because ambient conditions, including temperature and humidity all may impact a particular shreddant in a particular way. In addition, air gaps can introduce large systematic uncertainty when determining a permittivity representative of a predetermined “thickness” of stacked paper. Although subject to considerable variations on a small scale, a permittivity range representing a particular density range is approximately determinable.

For purposes herein, shreddant can be a material capable of being comminuted by a paper shredder, a batch can be one or more portions of shreddant, and shreddant density can be representative of a volumetric distribution of shreddant mass, which may be modified by an intervening layer of air. Shreddant density and batch shreddant density each can be surrogates for permittivity, e, a macroscopic material property of a medium, which may include shreddant that relates electric flux density D to an electric field E related to the shreddant, that is, in real terms:

$$\varepsilon = \frac{D}{E} \quad (1)$$

Figure 12:
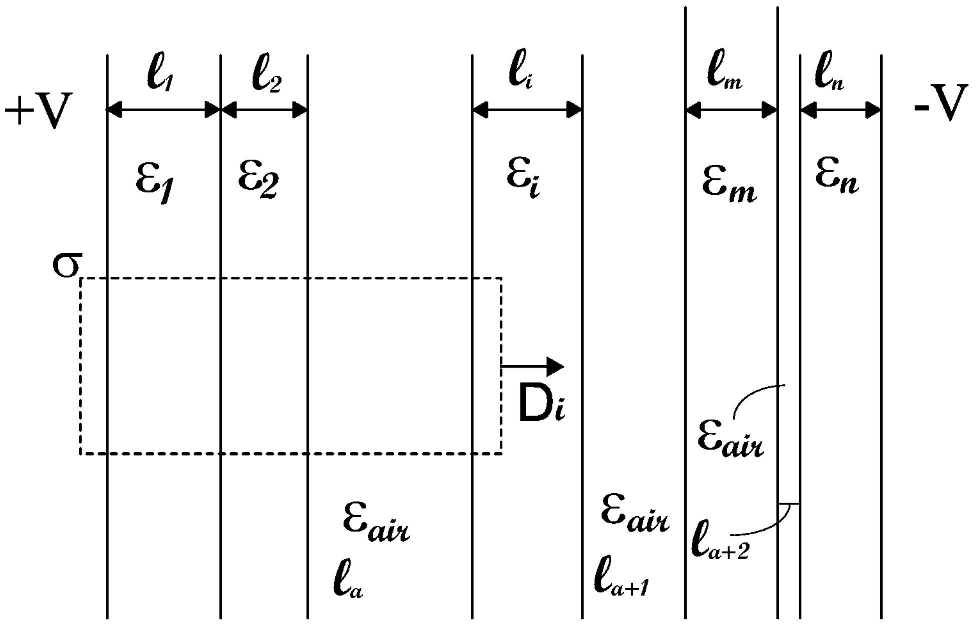
FIG. 12 is an illustration of permittivity value derivation for a shreddant stack, in accordance with the teachings of the present invention.

More specifically, FIG. 12 can be analyzed using one of Maxwell's equations, that is $$\oint_S D \cdot dA = q \quad (2)$$

Where D 1210 is the displacement vector, dA is the vectorial surface area with an outward (V+⇨ V−) normal 1220, and q 1230 is the charge enclosed by the closed surface S, 1240. Because ideal planar geometry can be assumed, the surface charge density on the electrode at potential V+ can be uniform and designated as +σ 1250. An opposite surface charge of −σ 1255 exists on the electrode at potential V−. Note that potential difference and not absolute potential is of concern in this analysis. Because a portion of the batch (e.g., a sheet of a paper) generally has linear characteristics, the relationship:

$$D = \in E, \quad (3)$$

which echoes the result of EQ. 1, generally holds where permittivity various with various layers are encountered, as depicted in FIG. 12.

Because of the planar geometry used, the D and E fields are directed substantially perpendicular to the planes of the electrodes and shreddant layers. If we take the closed surface to be the dotted rectangle 1270, so that the vertical sides represent surfaces of area A, then the non-zero contribution to the integral of EQ. 2 is the part over the right vertical surface where the displacement vector takes on the uniform value, labeled as Di. Therefore, the surface integral becomes $$Di = q = \sigma A, \text{ or} \quad (4)$$

$$Di = \sigma \quad (5)$$

Applying EQ. 3 to layer i, produces $$E_i = \sigma / \in \quad (6)$$

And the potential V can be described as $$V = -\int_C E \cdot dl \quad (7)$$

where the line integral begins at the V− electrode and ends on the V+ electrode.

In general, permittivity can vary as a function of frequency ∈(ω), however, as used herein "permittivity" is also known as "static relative permittivity," that is ∈(ω), where ω=0. Typically, $\in(0)_4$ is known as a material's "dielectric constant." Hereinafter reference to "permittivity" may be considered as the same as reference to "static relative permittivity," "dielectric constant," or k. A person of ordinary skill in the art would know that the dielectric constant (k) of air is about 1.0, and some measured values of the dielectric value of paper may range between about 1.5 to about 6.0. Typically, permittivity of a material can be viewed as product, that is, $$\in = \in o \times \in r \quad (8)$$

where ∈o is the permittivity of a vacuum, having a value of about $8.85\times10^{-12}$ $C^2/N\text{-}m^2$; and $\in_r$ is the relative permittivity (or dielectric "constant") for the material filling the gap in the permittivity detector represented by d.

Regarding the relative permittivity of a multiple layered shreddant, FIG. 12 also illustrates that total physical density is the sum of the density li of each element in the "stack" (here, viewed vertically), and including the sum of the air gaps (e.g., la, la+1, la+2) which may be interposed between solid pieces of shreddant. For convenience, fractional lengths may be defined as $$f_i = l_i / l \quad (9)$$

Each air gap has a static relative permittivity $\in_{air}=1$, and each of the interposed pieces of shreddant (assume paper) may have a static relative permittivity $1.5<\in_{paper}<6.0$. In FIG. 12, shreddant sheets are illustrated as having a respective static relative permittivity $\in_1, \in_2 \ldots \in_i, \in_m, \in_n$.

One having rudimentary training in the electrical engineering arts would understand that capacitance is a function of permittivity; but that permittivity is not a function of capacitance. Thus, the basic characteristic of permittivity is independent of the derived characteristic of capacitance, and that a permittivity sensor is not a capacitive sensor. Therefore, permittivity can be described herein without reference to capacitance, but any such reference is made to simplify understanding of principles of the present embodiments to a person of ordinary skill in the art.

In general, during normal operation, the safety cover can be opened to create an inlet with an acceptable gap. The empty gap (air-filled) represents a volume of air having an ascertainable permittivity value, ∈. Materials entering the gap may change a measured permittivity value across the gap, by changing an electric field imposed across the gap. For example, a gap that bounds an empty volume of air may have a first dielectric value, as represented by a first measured permittivity value, $\in_1$. An example of such a gap can be a shredder feed opening of a shredder feed inlet. When a single piece of paper is inserted into the feed inlet, though the gap, a second measured permittivity $\in_2$ of the (gap+paper) can be different from the measured permittivity of an empty gap. Similarly, a inlet gap into which ten (10) pieces of paper have been inserted may have a dielectric value quantified to a third measured permittivity $\in_3$ reflecting 10 pieces of paper being inserted into the inlet gap.

In a non-limiting example of the permittivity-based shredder control system, a shredder may be disposed to operate and shred paper when a measured permittivity value falls between the second measured permittivity value and the third measured permittivity value, $\in_1<\in<\in_2$. Similarly, a shredder may be disposed to de-energize the shredder motor, and not to perform a shredding operation when a measured permittivity level, $\in_s$, exceeds a predetermined maximum measured permittivity level, $\in_M$. Alternately, a shredder may be disposed to de-energize the shredder motor, and not to perform a shredding operation when a measured permittivity level is not within an operational permittivity range, e.g., $\in_s<\in_1$ or $\in_S>\in_2$. In addition, a shredder may be disposed to energize the shredder motor, and to perform a shredding operation when a measured permittivity level is within an operational permittivity range $\in_1<\in_s<\in_2$. As a non-limiting example, an operational permittivity range may be between a threshold of about $\in_1$ to a threshold of about $\in_2$, which may be representative of between about one sheet of paper to about 10 sheets of paper.

Figure 13A:
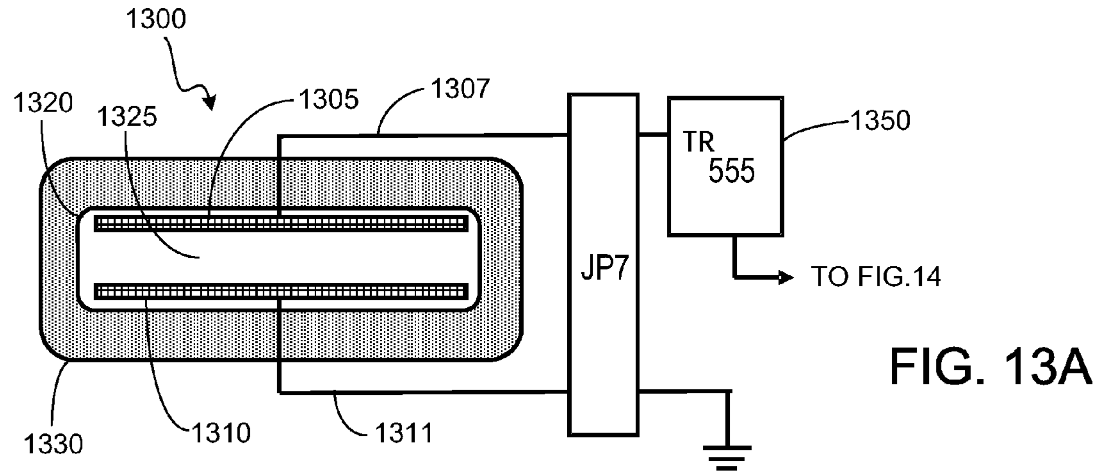
FIG. 13A is an illustration of a permittivity sensor having a first distribution of sensor elements, in accordance with the teachings of the present invention.
Figure 13B:
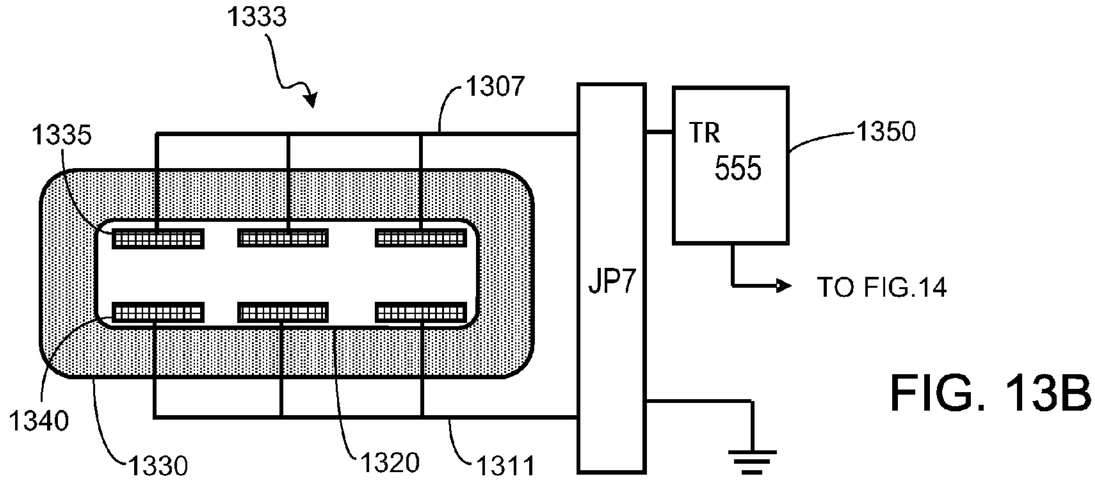
FIG. 13B is an illustration of a permittivity sensor having a second distribution of sensor elements, in accordance with the teachings of the present invention.
Figure 13C:
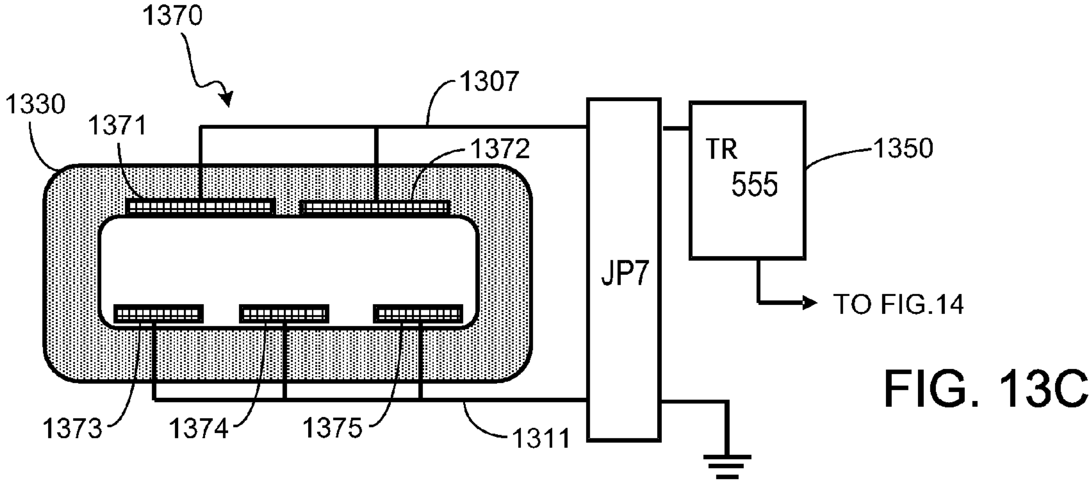
FIG. 13C is an illustration of a permittivity sensor having a third distribution of sensor elements, in accordance with the teachings of the present invention.

FIGS. 13A-C illustrate example alternative embodiments of a permittivity sensor elements and permittivity sensor. In FIG. 13A, sensor 1300 can include two conductive plates 1305, 1310 disposed on respectively opposing sides of an elongated shredder feed inlet opening 1320 in shredder upper housing 1330, which may include an inlet throat 1325. Conductive plates 1305, 1310 may be configured as opposing terminals formed with two adjacent longitudinally disposed conductive strips. Conductive plates 1305, 1310 can be located at the "mouth" of elongated shredder feed inlet opening 1320, or may be disposed in opposition in inlet throat; generally distal to the mouth. Conductive plates 1305, 1310 may be formed from an exposed or semi-exposed conductor, including, without limitation, a thin metallic sheet or metallic foil, although other conductive materials may be used. Plates 1305, 1310 can be coupled to respective leads 1307, 1311, which can be coupled to a permittivity-measuring circuit 1315, through oscillator element 1350. Plate 1305 may be coupled to signal sensing section of oscillator element 1350 at V+, whereas conductive plate 1310 may be coupled to signal lead −V or GND.

In FIG. 13B, sensor 1333 can be formed from two sets of conductive strips 1335, 1340, respectively, with each set 1335, 1340 representing a corresponding opposing terminal, with each terminal set 1335, 1340 being longitudinally disposed on opposing sides of an elongated shredder feed inlet opening 1320 in shredder upper housing 1330. In the aggregate, plural conductive strips, generally at 1335, which can serve a first terminal, for example, a V+ terminal. Similarly, in the aggregate, plural conductive strips, generally at 1340, can serve a second terminal, for example, a V− or GND terminal. In some embodiments, each of the plural conductive strips 1335 may be paired electrically with one of a respective conductive strip, generally at 1340. Plates 1335, 1340 can be coupled to respective leads 1307, 1311, which can be coupled to a permittivity-measuring circuit 1315, which may include oscillator element 1350. Plate 1335 may be coupled to signal sensing section of oscillator element 1350 at V+, whereas conductive plate 1340 may be coupled to signal lead −V or GND.

In FIG. 13C, sensor 1370 can be formed from two or more conductive strips 1371-1375, arranged in a predefined field sensor pattern. In addition, selected conductive strips, such as strips 1371-1372, may be partially or completely enclosed within a portion of shredder upper housing 1330, for example, proximate to elongated shredder feed inlet opening 1320. In FIG. 13C, strips 1371-1372 are illustrated as being electrically joined to form a conductive terminal, here, a V+ terminal. Similarly, strips 1373-1375 are illustrated to be longitudinally disposed on shredder upper housing 1330, proximate to feed inlet opening 1320, and in opposition to strips 1371-1372, forming a V− or GND terminal. Strips 1371-1372 and 1373-1375 can be coupled to respective leads 1307, 1311, which can be coupled to a permittivity-measuring circuit 1315, through oscillator element 1350. Strips 1371-1372 may be coupled to signal sensing section of oscillator element 1350 at V+, whereas conductive strips 1373-1375 may be coupled to signal lead −V or GND.

Figure 14:
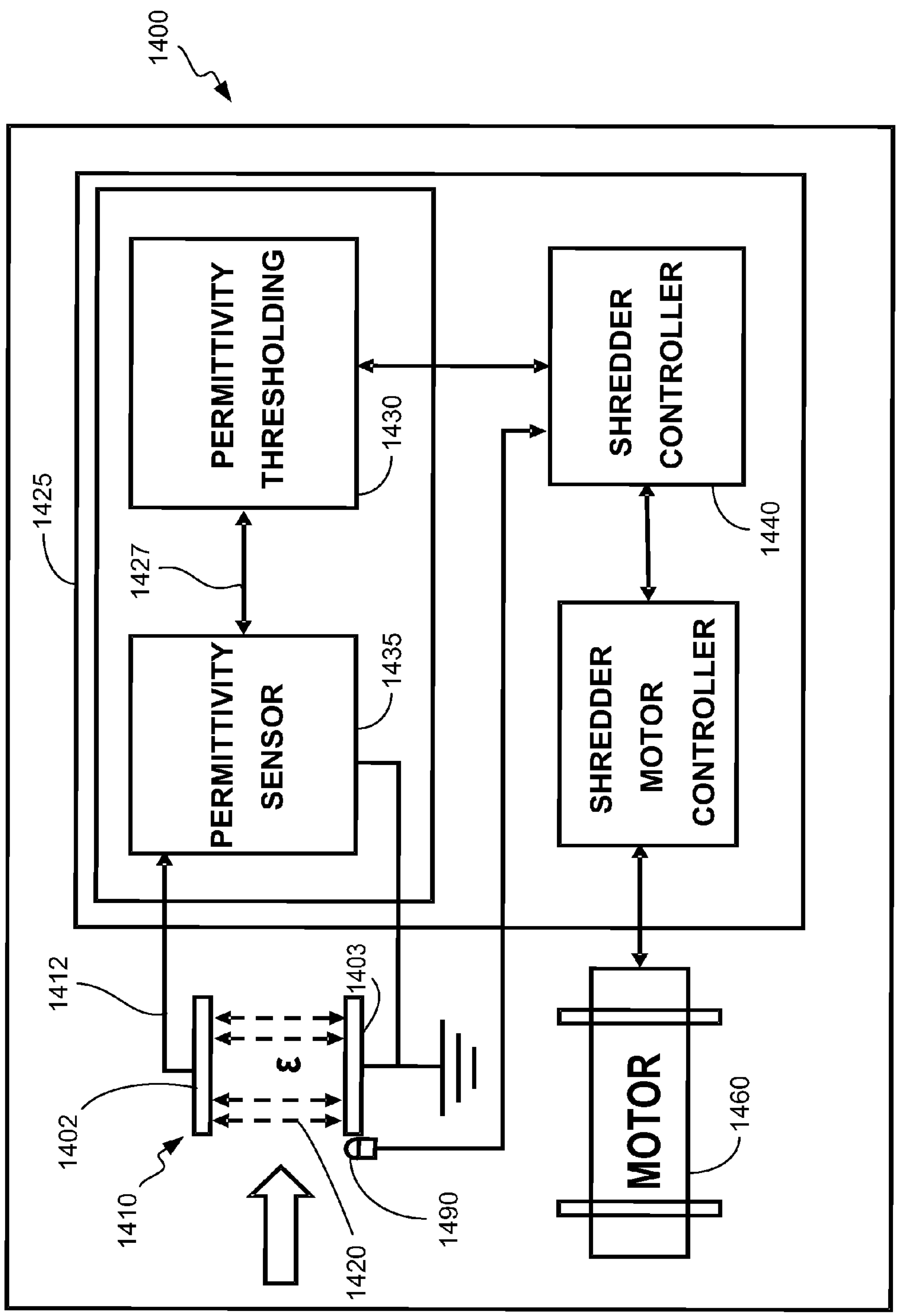
FIG. 14 is an illustration of an example embodiment of a permittivity-based shredder control system, in accordance with the teachings of the present invention.

FIG. 14 depicts an example embodiment of a paper shredder, symbolically represented by 1400, including permittivity-responsive shredder control system 1425. Shredder control system 1425 can include permittivity signal conditioning system 1435, which may constitute permittivity sensor 1410 coupled to permittivity sensor elements 1402, 1403, and permittivity thresholding module 1430, coupled to permittivity sensor 1410. Permittivity control system 1425 also can be coupled to paper shredder motor 1460. Permittivity sensor elements 1402, 1403, are disposed to sense permittivity, or a change in permittivity, in a defined volume proximate to permittivity sensor elements 1402, 1403. In general, electric field 1420 can be established relative to permittivity sensor elements 1402, 1403. Sensor elements 1402, 1403 can be responsive to a disturbance of imposed electric field 1420, which may be caused by a permittivity change in the defined volume between sensor areas 1402, 1403. Although a skilled artisan would know that a variety of permittivity sensors and permittivity sensor elements may be used, an example of sensor and sensor elements may be a permittivity sensor having at least two set-apart parallel conductive plate elements. When an electric charge is imposed upon conductive plates 1402, 1403, electric field 1420 is formed characteristic of the permittivity of material interposed between plates 1402, 1403. When a material having a different permittivity is interposed between plates 1402, 1403, electric field 1420 experiences a disturbance having a magnitude corresponding to the difference in permittivity of the material interposed. The disturbance elicits sensed permittivity signal 1412 in conductive plates 1402, 1403, which is coupled to permittivity sensor 1410. The disturbance may activate shredder controller 1440, or a photosensitive element 1490 may activate shredder controller 1440.

Permittivity detector 1410 may receive and may amplify, filter, or quantize, sensed permittivity signal 1412, to produce conditioned permittivity signal 1427. Amplifying may include, without limitation, current or voltage amplification or stabilization. Filtering may include, without limitation, signal leveling and noise reduction. Quantization may include producing an integer numerical value for conditioned permittivity signal 1427 corresponding to sensed permittivity signal 1412. Permittivity thresholding module 1430 may analyze conditioned permittivity signal 1427 to determine whether a threshold value for conditioned signal 1427 exceeds a predetermined jam threshold value. Alternately, permittivity thresholding module 1430 may determine at least one of whether conditioned permittivity signal 1427 is within a predetermined shredding operation range, whether signal 1427 is above the predetermined shredding operation range, or whether signal 1427 is below the predetermined shredding operation range. In response to the sensed permittivity condition as represented by conditioned permittivity signal 1427, shredder control system 1425 may selectively energize or de-energize motor 1460. Also, shredder control system 1425 may energize motor 1460 to operate in a forward rotation or in a reverse rotation.

Figure 15:
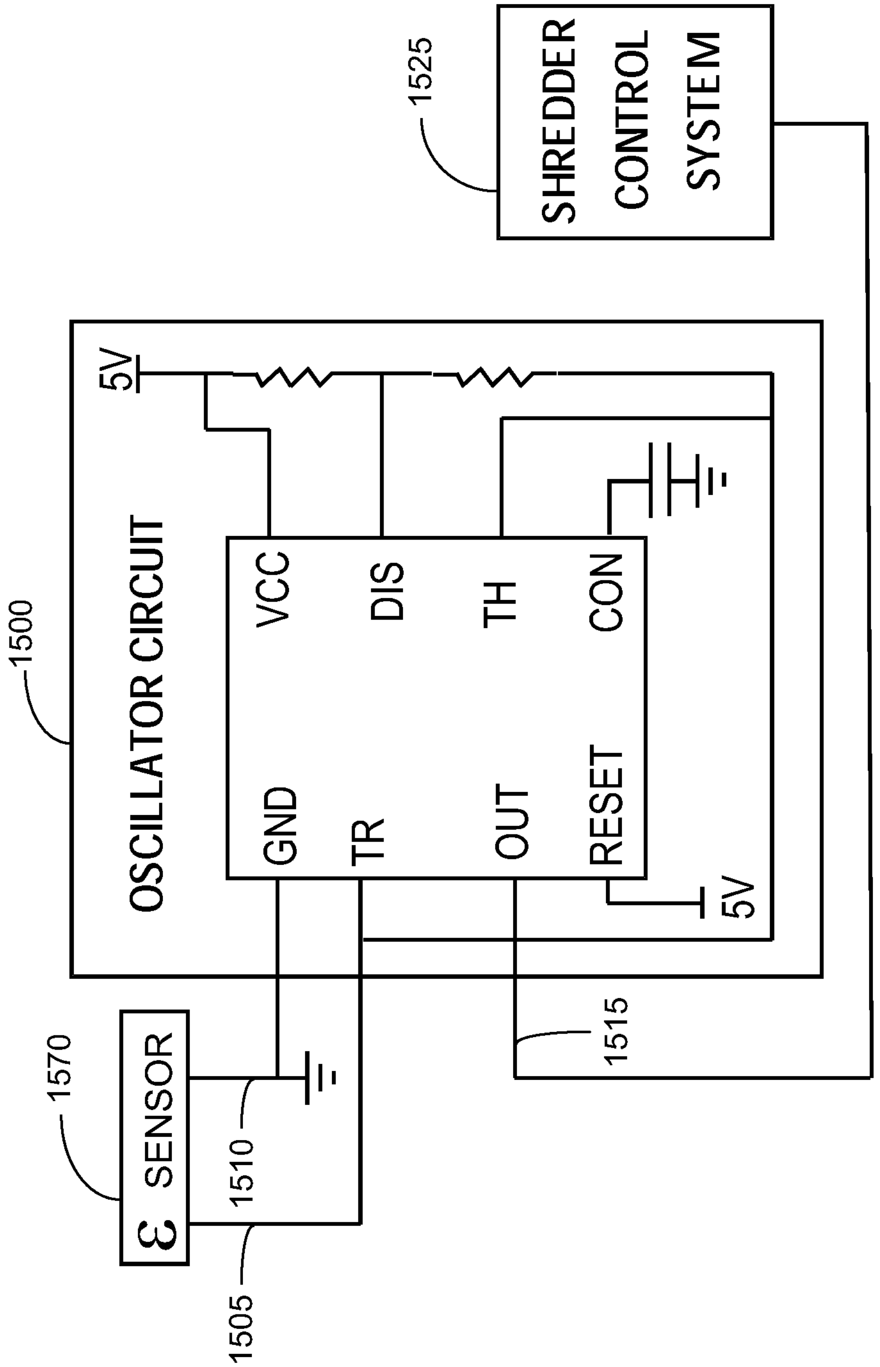
FIG. 15 is an illustration of a permittivity sensor using an oscillation circuit, in accordance with the teachings of the present invention.

Turning to FIG. 15, an embodiment of oscillator circuit 1500, similar to oscillator element 1450, in FIG. 14 is described. Oscillator circuit 1500 may receive a differential input from input leads 1505, 1510, with the electrical difference therebetween being representative of a measured permittivity value within sensor 1570. The differential input may be reflected as an identifiable oscillation count number determined through the interplay of input leads 1505, and 1510. Oscillator circuit 1500 may periodically detect a sensor permittivity value measurement 1515, and may report a change in measurement 1515 to control circuit 1525. Oscillator circuit 1500 may be configured to measure discrete values of permittivity, or may be configured to identify at least one predetermined permittivity threshold value. In addition, permittivity sensor 1570 having an exposed V+ sensor element also may be used as touch-controlled sensor in which a safety stop, described with respect to FIG. 9, is performed upon detecting contact by sensing bioelectricity from a living being.

Figure 16:
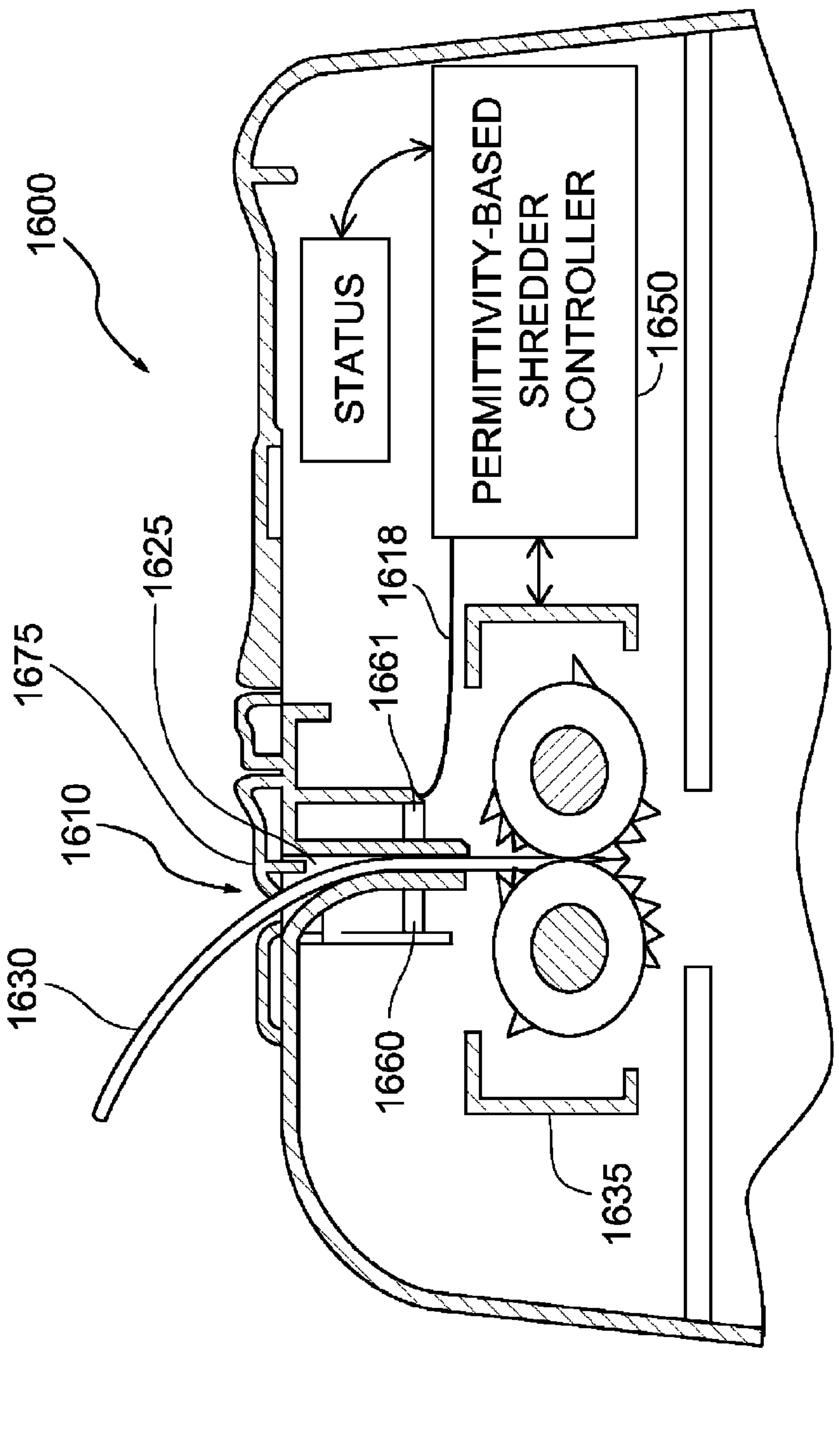
FIG. 16 is a cross-sectional illustration of a paper shredder having a permittivity-based controller, in accordance with the teachings of the present invention.

FIG. 16 illustrates an example embodiment of paper shredder 1600, which may be controlled by permittivity-based shredder controller 1650. Paper shredder 1600 may incorporate elements and circuits described relative to the description pertaining to FIGS. 1-15. In general, paper shredder 1600 is formed with paper feed inlet opening 1610 incorporating a feed gap 1625, to accommodate shreddant 1630, such as a paper sheet. In some embodiments, permittivity changes due to the insertion of one sheet of paper into an empty paper feed inlet opening 1610 can be sensed by two or more permittivity sensor elements 1660, 1661, which produce a permittivity output signal 1618 sufficient to cause permittivity-based shredder controller 1650 to initiate a shredding operation by actuating electromechanical shredder mechanism 1635. Electromechanical shredder mechanism 1635 may include a shredder motor and shredder blades. Alternatively, paper feed inlet opening 1610 may be disposed with an infrared sensor 1675, which sensor 1675 may be configured to initiate a shredding operation, similar to the above, when sensor 1610 detects an object in feed gap 1625.

Figure 17:
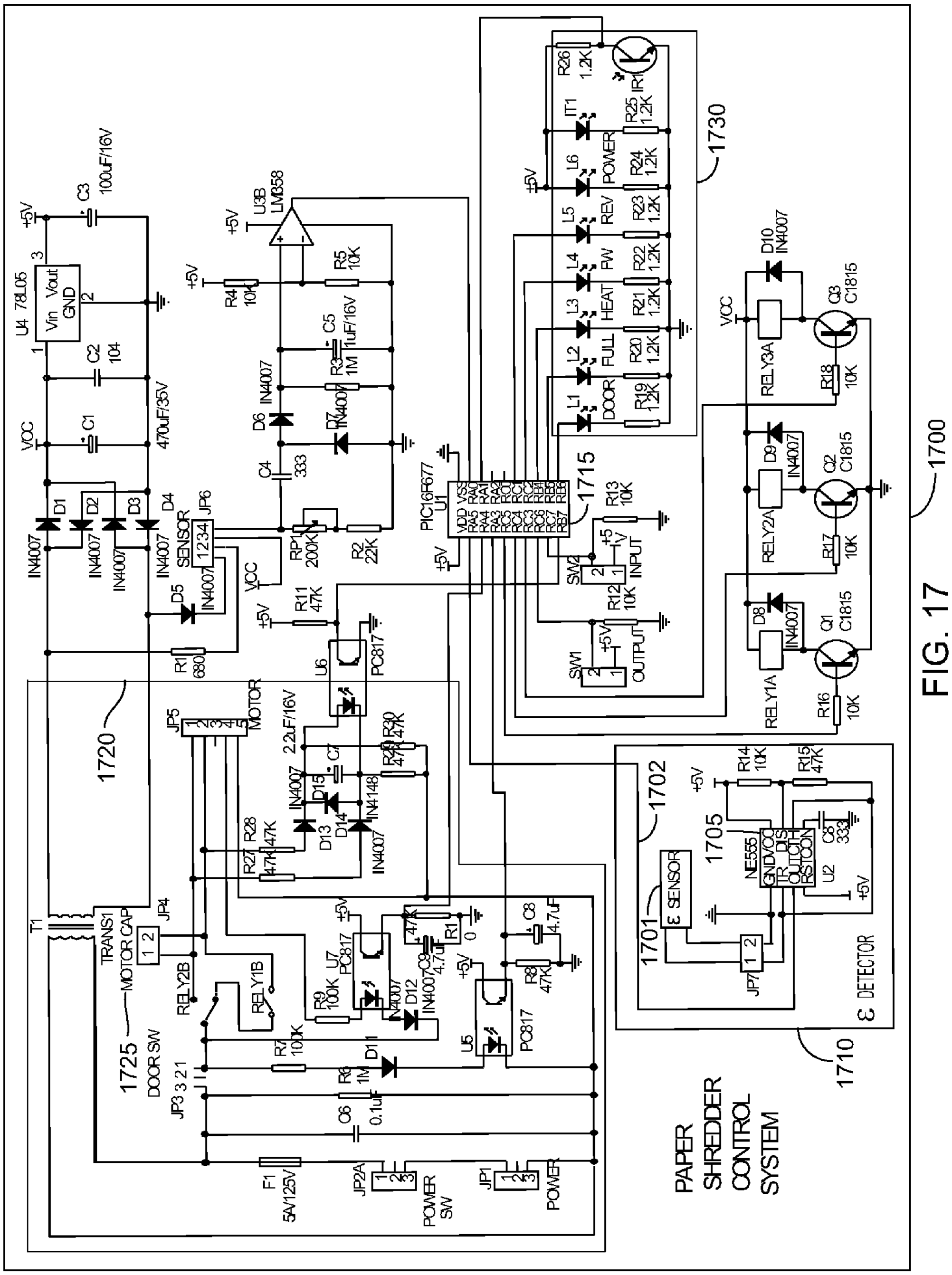
FIG. 17 is a schematic diagram of a permittivity-based shredder control system, in accordance with the teachings of the present invention.

FIG. 17 is a schematic diagram of an example embodiment of permittivity-based paper shredder control system 1700, in accordance with the teachings herein. Control system 1700 includes permittivity detector 1710, shredder controller (MPU) 1715, and shredder motor controller 1720. Shredder motor controller 1720 can be coupled to a shredder motor 1725 which, in turn, can be mechanically coupled to a plurality of shredder blades (not shown). Control system 1700 may include a status indicator, for example, indicator light group 1730, which provides a perceptible indication of a status of a shredder. Moreover, control system 1700 may be coupled to one or more sensor or control element to effect a function of the shredder. Such a sensor or control element can provide a safety function, which may protect a shredder or a user from harm. Examples of a sensor or control element may include, without limitation, permittivity detector 1710, power switch (POWER SW), a waste bin door status switch (DOOR SW), or full waste bin (JP6 SENSOR). MPU 1715 provides detection, operation, analysis, indication, or control functions to the shredder in accordance with functional process software, which may be programmed into memory integrated into MPU 1915. A suitable example of MPU 1715 may be a PIC16F677 20-Pin, 8-Bit CMOS Microcontroller with integrated Flash-type memory, produced by Microchip Technology Inc., Chandler, Ariz. USA. Specifications and operational examples of the PIC16F677 may be found in PIC16F631/677/685/687/689/690 Data Sheet: 20-Pin Flash-Based, 8-Bit CMOS Microcontrollers with nano Watt Technology, Doc. No. DS41262E, Microchip Technology Inc, Chandler Ariz., 2008, available at URL: http://wwl.microchip.com/downloads/en/DeviceDoc/41262E.pdf on Feb. 2, 2011, which data sheet document is incorporated herein in its entirety.

Other microcontrollers may be used, as may be substituted by one of ordinary skill in the art. Permittivity detector output signal may be received, for example, on MPU 1715 input RA5 which, for the identified device, also is designated as T1CK1 pin. With T1CK1 pin coupled to oscillating permittivity detector output signal 1702, MPU 1715 can include the function of a timer or a counter.

When a permittivity condition signal is coupled from, for example, OUT pin 3 of oscillator circuit 1510 in FIG. 15 to pin T1CK1 of MPU 1715, MPU 1715 counts each periodic oscillation during a predetermined sensing period by incrementing a value held by MPU counter T1. MPU timer T0 determines the predetermined sensing period. At the end of the predetermined sensing period, counter T1 identifies the magnitude of the permittivity condition signal as the counted number of periodic oscillations counted during the period. The counted number of periodic oscillations then may be recorded by MPU 1715, and the value of MPU counter T1 can be reset at the beginning of the next predetermined sensing period measured by MPU timer T0. In general, the counted number of periodic oscillations is proportional to magnitude of the permittivity condition signal, as related to oscillator period T. In selected embodiments herein, a suitable value for the predetermined sensing period may be about 0.065536 seconds (or 65.536 milliseconds).

MPU 1715 also may be programmed with MPU instructions, which when executed on MPU 1715, implement a main process (also called main program) including at least one subprocess (also called subprogram), when selected MPU-based instructions are executed on MPU 1715.

In a non-limiting example embodiment using the schematic of paper shredder control system 1700, oscillator circuit 1705 may include an astable multivibrator/timer, such as the NE555 timer, which can be configured with operational elements R14 and R15 and C8. Those of ordinary skill in the art would recognize that when R14 has a value of about 10 kilohms, R15 has a value of about 47 kilohms, and C8 has a value of about 33 nanofarads, oscillator circuit 1705 asserts a signal to control circuit 1715, which can be representative of the measured permittivity value. Control circuit 1715 can cooperate with oscillator circuit 1700 to maintain an accurate periodic permittivity measurement. As will be recognized by those of ordinary skill in the art, the period T of oscillator 1700 can be approximated by the formula:

$$T \approx 0.7(R14 + 2 \times R15) \times \frac{\varepsilon A}{d} \tag{10}$$

where: T is the oscillation signal period of oscillator circuit 1700;

R14 is the resistance value assigned to resistor R14;

R15 is the resistance value assigned to resistor R15;

A is the overlapping area of opposing elements;

d is the distance between the overlapping elements; and $\in$ is permittivity.

Of course, R14, R15, A, and d may remain substantially constant. Therefore, the oscillation signal period of oscillator circuit 1705, T, varies with permittivity, $\in$, of the volume between the area A of overlapping opposing elements, as separated by distance d. While the final right-handed term in EQ. 1 can be associated with capacitance, one having rudimentary training in the electrical engineering arts would understand that while capacitance is a function of permittivity, permittivity is independent of capacitance. Thus, the basic characteristic of permittivity is independent of the derived characteristic of capacitance, and that a permittivity sensor is not a capacitive sensor. Therefore, permittivity can be described herein without reference to capacitance, but any such reference is made only to simplify understanding of principles of the present embodiments to a person of ordinary skill in the art.

In the embodiment of system 1700 in FIG. 17, R14 is provided as a 10 kilohm resistor, and R15 is provided as a 47 kilohm resistor, although other values may be used. In an example embodiment of a paper inlet opening sensor configuration, the common area, S, of the parallel plates of sensor 1701 may be about $8.2\times10^{-3}$ m$^2$, and the distance between the plates, d, may be about $3.0\times10^{-3}$ m.

$$T \approx 201{,}899 \times \in_r \tag{11}$$

Clearly, oscillation period, T, is a function of permittivity. Therefore a change in relative permittivity, $\in_r$, of material introduced in the paper feed inlet opening at the sensor can be reflected as a change in the oscillation period, T, of oscillator circuit 1705.

When one or more sheets of paper are introduced into the shredder feed inlet air gap, d, the content of air gap d is changed in both gap width, and permittivity, so that at least two dielectric materials, each having different values, are placed between the two or more capacitor plates with a common area S. In this non-uniform dielectric situation, the first dielectric (e.g., air) has a permittivity of $\in_{AIR}$ and a thickness of $m_{AIR}$, and the second dielectric (e.g., one or more sheets of paper) has a permittivity of $\in_{PAPER}$ and a thickness of $m_{PAPER}$.

The period T of oscillator circuit 1705, as a function of both permittivities and both material thicknesses:

$$T \approx 0.7(R14 + 2 \times R15) \times \frac{S\varepsilon_{AIR}\varepsilon_{PAPER2}}{m_{AIR}\varepsilon_{PAPER} + m_{PAPER}\varepsilon_{AIR}} \tag{12}$$

The effects of capacitance, C, are nullified and are not used to sense permittivity. In the embodiment of oscillator circuit 1705 in FIG. 17, R14 is provided as a 10 kilohm resistor, and R15 is provided as a 47 kilohm resistor, although other values may be used. In a paper inlet opening sensor configuration in which the common area of the parallel plates may be about $8.2\times10^{-3}$ $m^2$, EQ. 12 can be simplified to $$T = 605.7 \times \frac{\varepsilon_1\varepsilon_2}{T_1\varepsilon_2 + T_2\varepsilon_1} \tag{13}$$

Again, the effects of capacitance, C, are nullified. Clearly, EQ. 11-16 may represent an improvement in the modeling of air/dielectric combination, which may be encountered by a paper shredder. Even so, it has been found that it may be sufficient to treat judiciously selected instances of nonuniform dielectric (e.g., paper+air), as being emblematic of a corresponding threshold point, allowing for simplification of paper thickness sensing and using inexpensive components.

TABLE 1 illustrates empirical results obtained by prototype:

TABLE 1

| SHEETS OF PAPER | PERMITTIVITY | Δϵ |
|---|---|---|
| NONE (Zeroth) | ϵ ≅ 1.465 F/m | N/A |
| ONE (1) | ϵ ≅ 1.506 F/m | 0.041 F/m |
| TEN (10) | ϵ ≅ 1.872 F/m | 0.407 F/m |

TABLE 1 indicates that threshold permittivity values measured using permittivity detector 1770 can be among the identifiable threshold points to initiate, to not initiate, or to stop shredder operation using a signal sent to shredder control system 1715. By responding to change of permittivity at a predetermined threshold, as compared to a self-determined start point (Zeroth value), more complex modeling may be obviated and dependence, if any, on other variable values, e.g., C, may be ignored.

Permittivity detector 1710 also can provide a touch-sensitive safety mechanism when a conductive plate such as 1505 in FIG. 15 is exposed to permit physical contact with a living being. Living beings emanate bioelectricity or bioelectric signals, which can be used to control operation of system 1700. Such physical contact may facilitate the transmission of bioelectricity from the living being, which is coupled to shredder logic control system 1715. In reaction thereto, motor controller may de-energize the shredder or may implement a safety stop.

Figure 18:
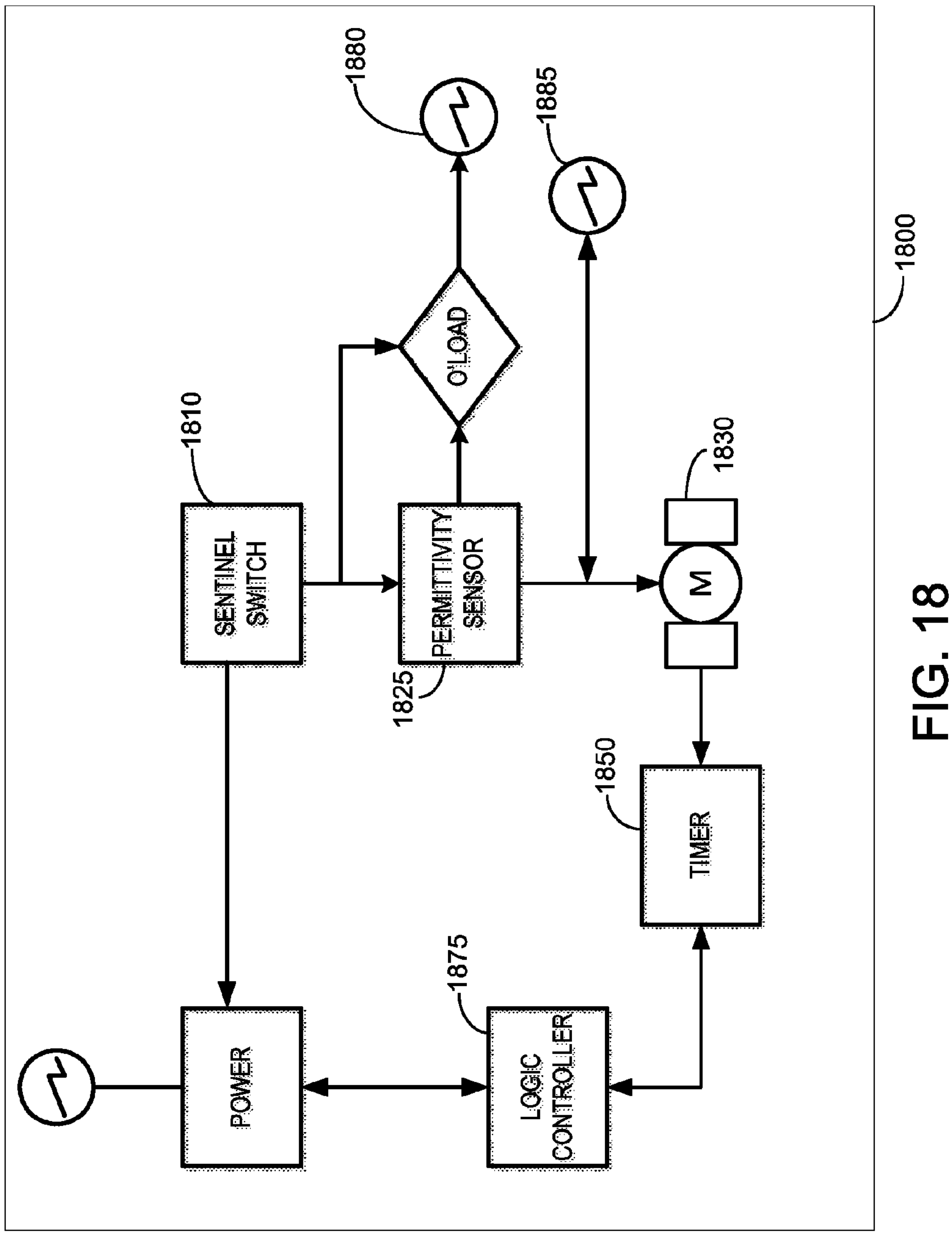
FIG. 18 is a block diagram of a first example embodiment of an permittivity-based shredder control system with sentinel operation, in accordance with the teachings of the present invention.

FIG. 18 depicts another example embodiment of a permittivity-based paper shredder 1800, including sentinel switch 1810 and sentinel timer 1850. In such a configuration, sentinel switch 1810 can be used in place of a power switch, and can operate in conjunction with timer 1850 to place shredder power in ON, standby, and OFF states. The STANDBY state can be defined over a predetermined interval during which sentinel timer 1850 can measure a count up, or count down, to define a predetermined sentinel interval, after which shredder 1800 can be turned OFF, and motor 1830 can be de-energized, or electrically de-activated. By introducing a shreddant batch within a predetermined shreddant batch density range into a preselected portion of the shredder feed opening (not shown), permittivity sensor 1825 can received and detect a shreddant batch and can cause shredder motor 1830 to be electrically energized for operation. Energization of shredder motor 1830 can initiate timer 1850 to operate over a predetermined operation interval during which shredder 1800 can remain in a standby state. During this interval, permittivity sensor 1825 can reactivate electric motor 1830 to comminute a shreddant batch. However, after a predetermined sentinel interval, for example, about 5 minutes, power can be disconnected from electric motor 1830, from logic controller 1820, or both. To return shredder 1800 electrical elements to an ON/standby state, sentinel switch 1810 would be displaced from its OFF/deactivated position.

Figure 19:
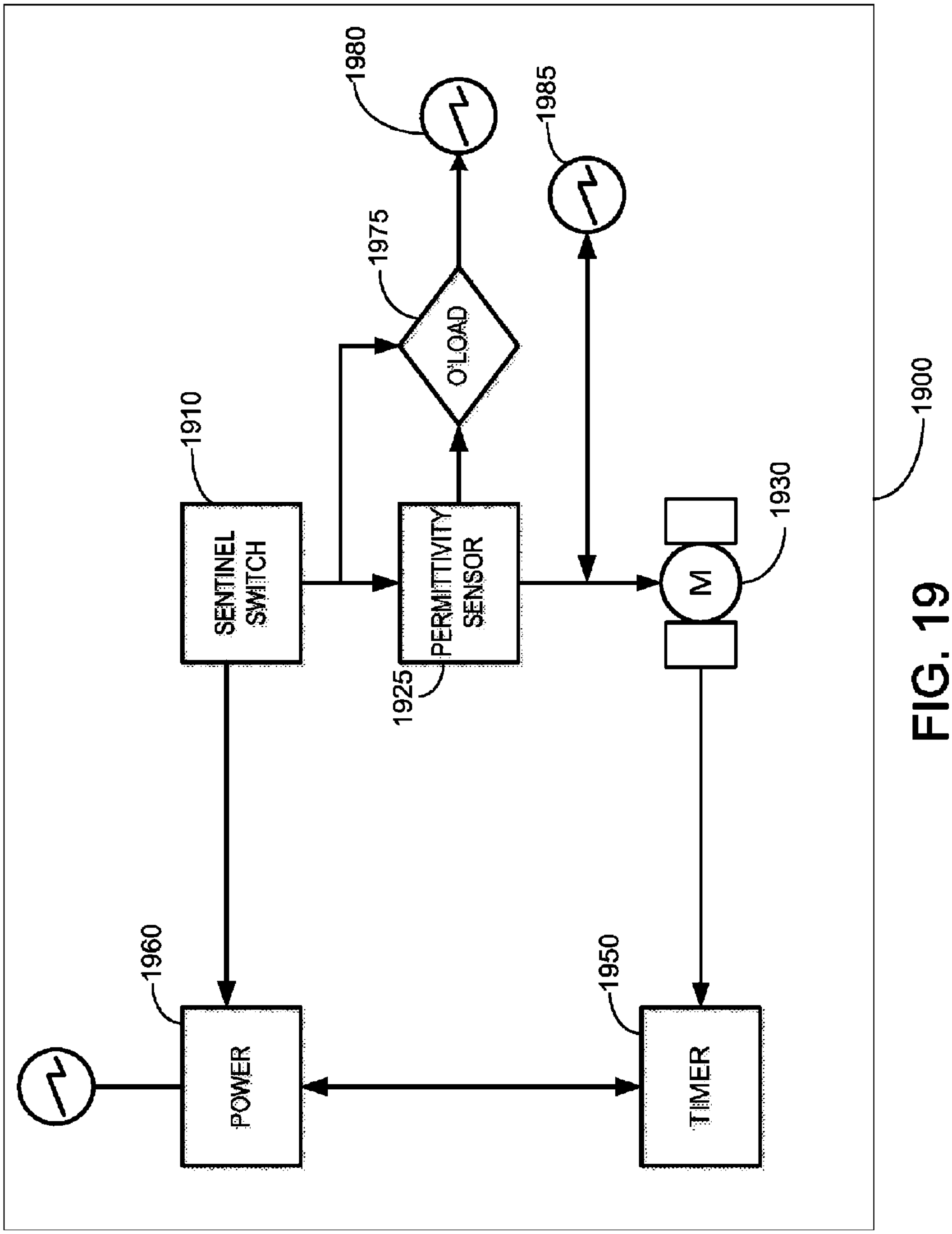
FIG. 19 is a block diagram of a second example embodiment of an permittivity-based shredder control system with sentinel operation, in accordance with the teachings of the present invention.

Sentinel switch 1810 also may be used to restart comminution when additional shreddant is introduced into the shredder. Indicator 1880 may indicate a batch shreddant density having a permittivity value not within a predetermined permittivity range, for example at an incipient jam, an inappropriate shreddant, or a living being. Indicator 1885 can be used to indicate conditions resulting fin the overheating or the overloading the shredder motor 1830. Regardless of initiation technique, however, an inappropriate measured permittivity value identified using permittivity sensor element 1825 may indicate that the object is too thick, or is not shreddable, causing control system 1875 to de-energize electromechanical shredder mechanism 1830. In some embodiments, control system 1875 can stop electromechanical shredder mechanism 1830, can cause electromechanical shredder mechanism 1830 to operate in reverse, with the aim of disgorging from the shredder blades any entrapped object, and then to deactivate and stop electromechanical shredder mechanism 1830. A safety stop, as described relative to FIG. 9, also may be initiated through permittivity-based shredder controller 1875 by an object sensed by permittivity sensor elements 1825. For an example of a shreddable object representing pieces of paper, when the number of sheets of paper introduced into the paper feed inlet generates a permittivity value that exceeds a predetermined overfeed threshold, then the control system causes the motor to respond to an overfeed or jam, state. An example of a object which is "not shreddable," may be a portion of a living being, FIG. 19 depicts one example embodiment of a permittivity-based paper shredder 1900, including sentinel switch 1910 and sentinel timer 1950. In some embodiments, sentinel switch 1910 can serve as a power-ON/Standby switch and can be disposed at a shredder feed opening. Shredder 1900 can employ a power switch 1960 with power supply in conjunction with sentinel switch 1910. Power switch 1960 can be used to turn ON or OFF power to the electric elements of shredder 1300. In a first position of sentinel switch 1910, shredder electrical elements such as shredder motor, logic controller, or both, can be set to a Standby state. When a shreddant batch is introduced into a shredder feed opening, sentinel switch 1910 can be moved to a sentinel switch second position. In a second position, sentinel switch 1910 can activate permittivity sensor 1925, and connect electric power to shredder motor 1930, shredder controller 1920, and sentinel timer 1950. Overload logic 1975 may determine the existence of a overload state and activate overload indicator 1980. In addition, logic 1975 may detect a motor overheating or jammed state and may activate overheating indicator 1985.

Figure 21:
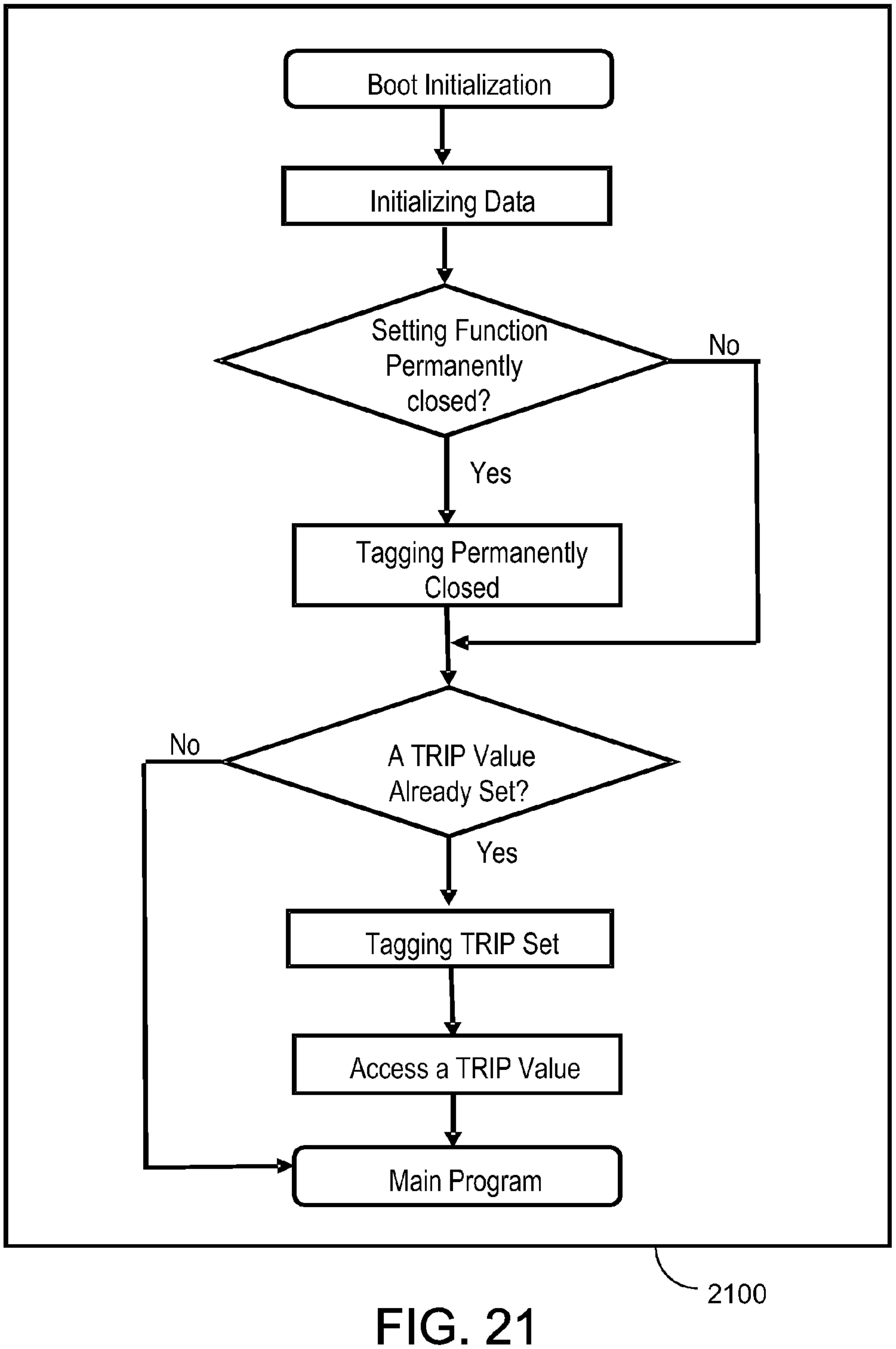
FIG. 21 is a flow diagram of a boot initialization subprocess for a shredder operation, in accordance with the teachings of the present invention.
Figure 22:
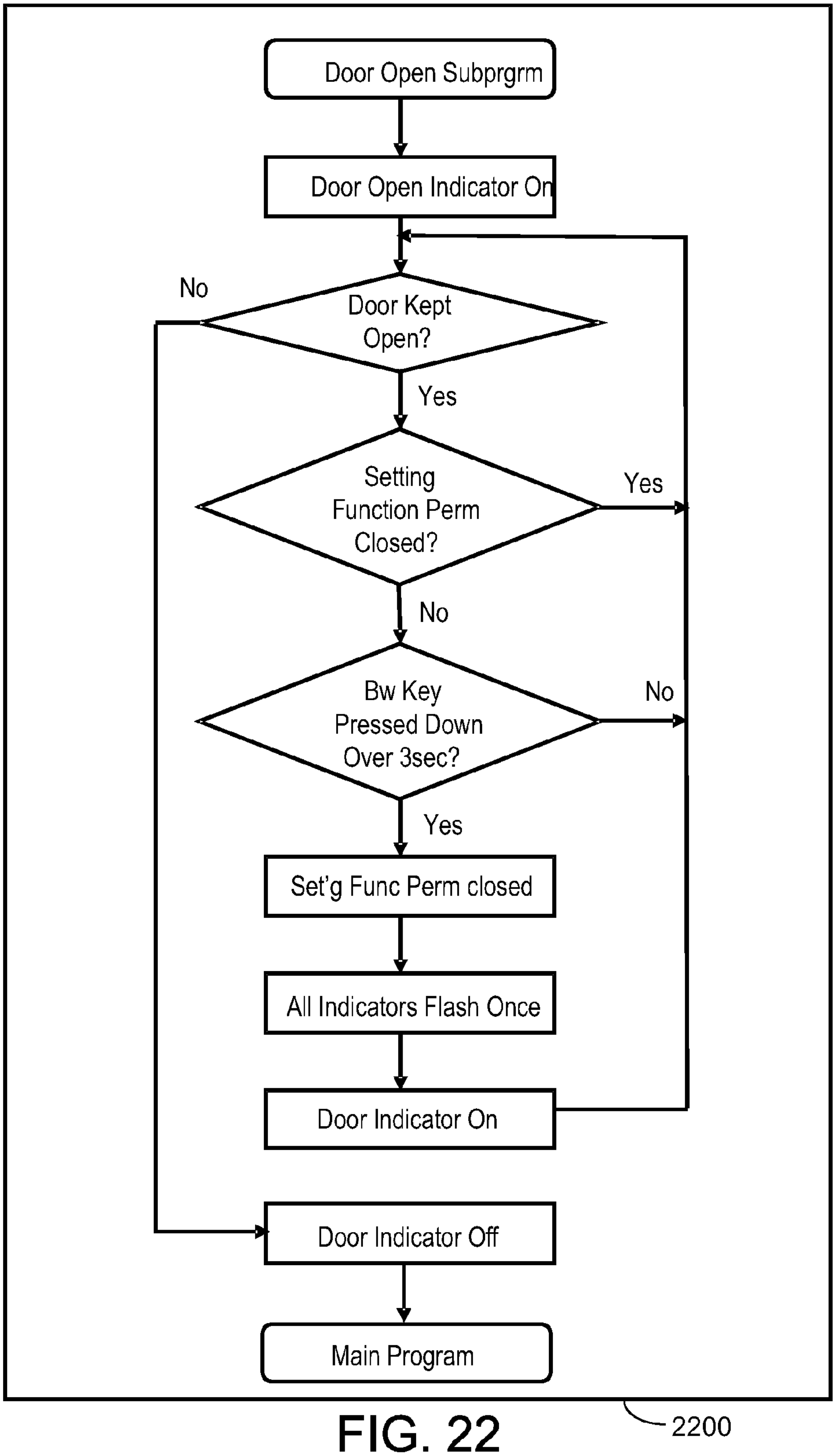
FIG. 22 is a flow diagram of a door open subprocess for a shredder operation, in accordance with the teachings of the present invention.
Figure 25:
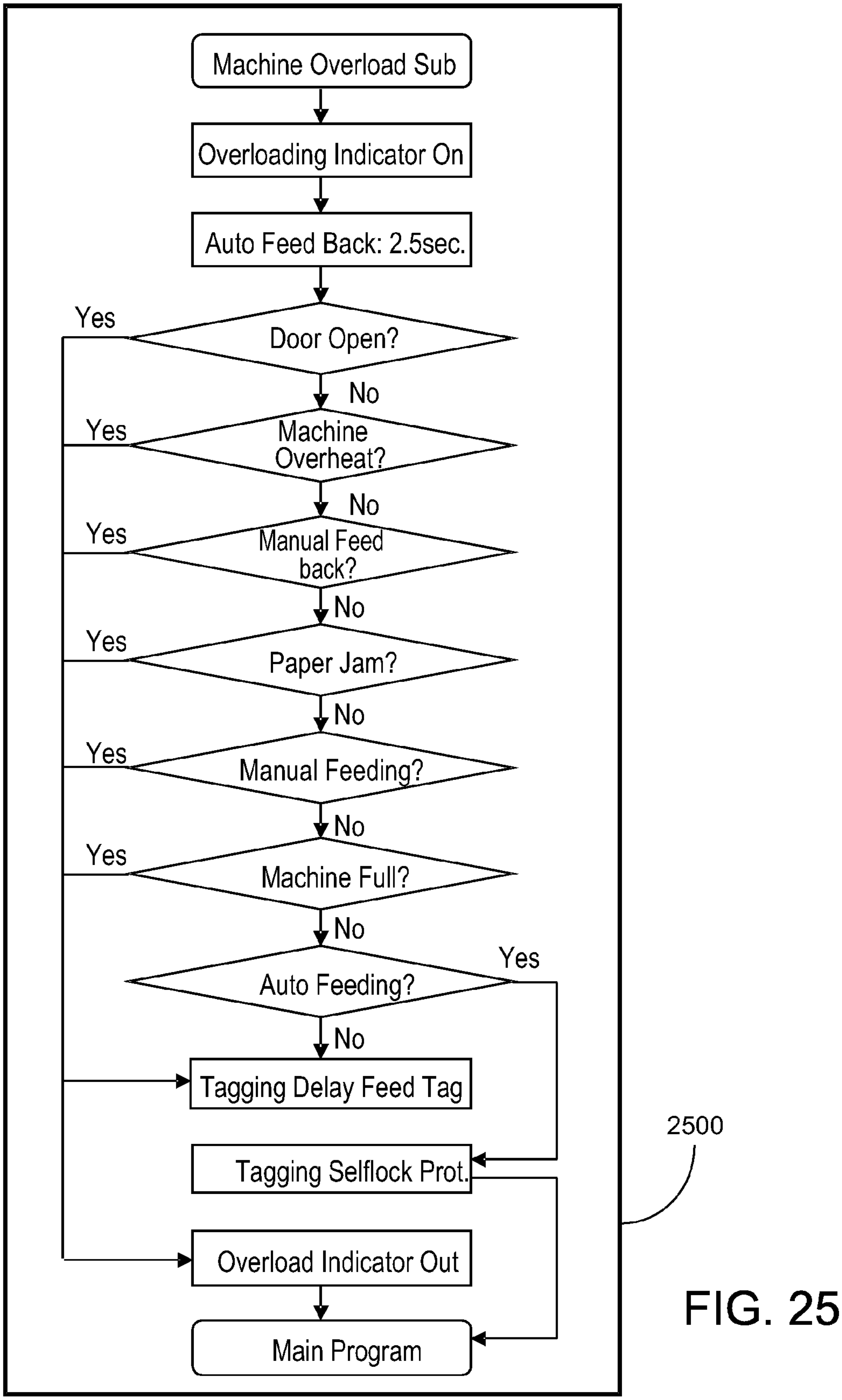
FIG. 25 is a flow diagram of a machine overload subprocess for a shredder operation, in accordance with the teachings of the present invention.
Figure 26:
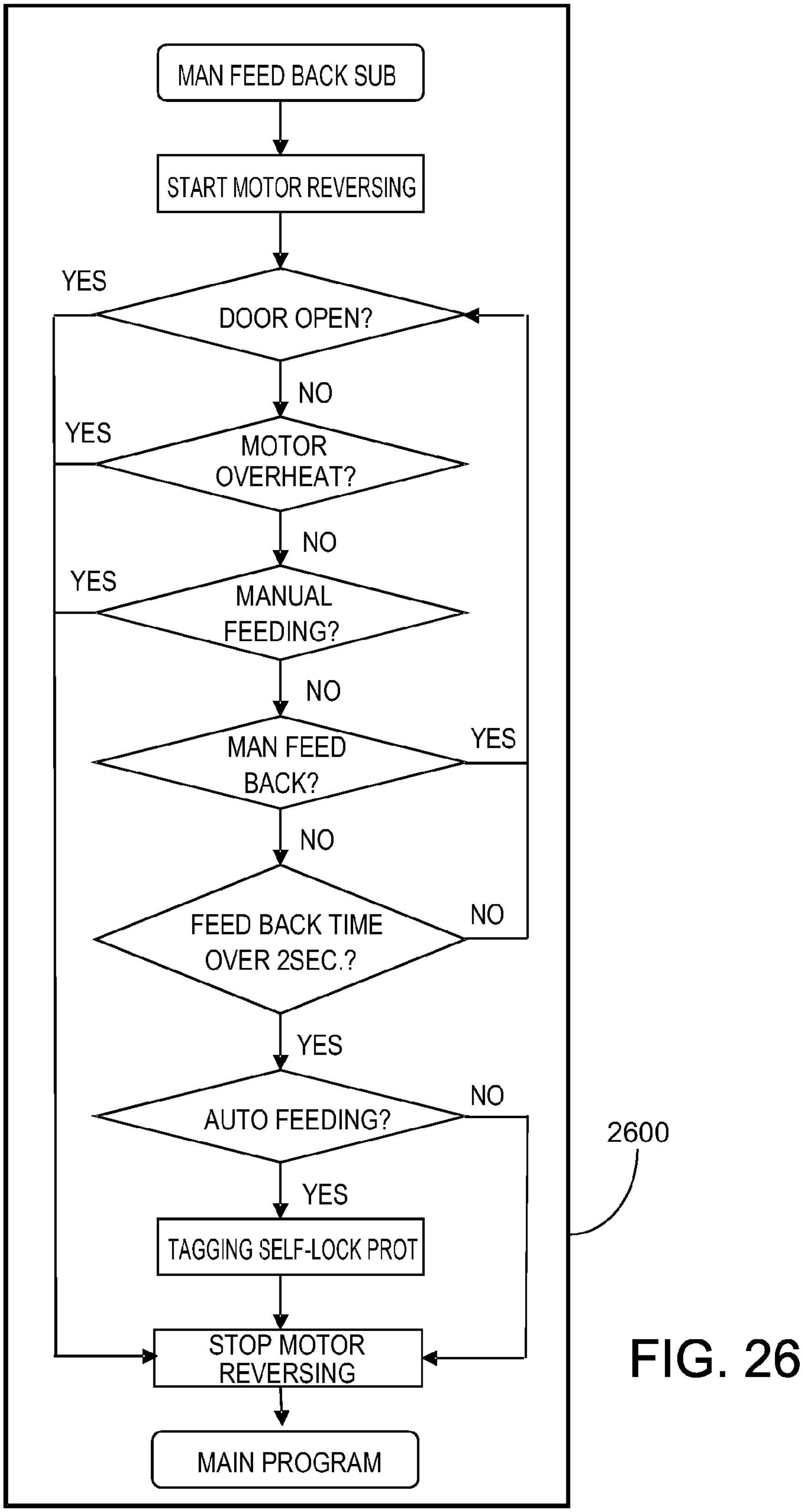
FIG. 26 is a flow diagram of a manual reverse feed subprocess for a shredder operation, in accordance with the teachings of the present invention.
Figure 27:
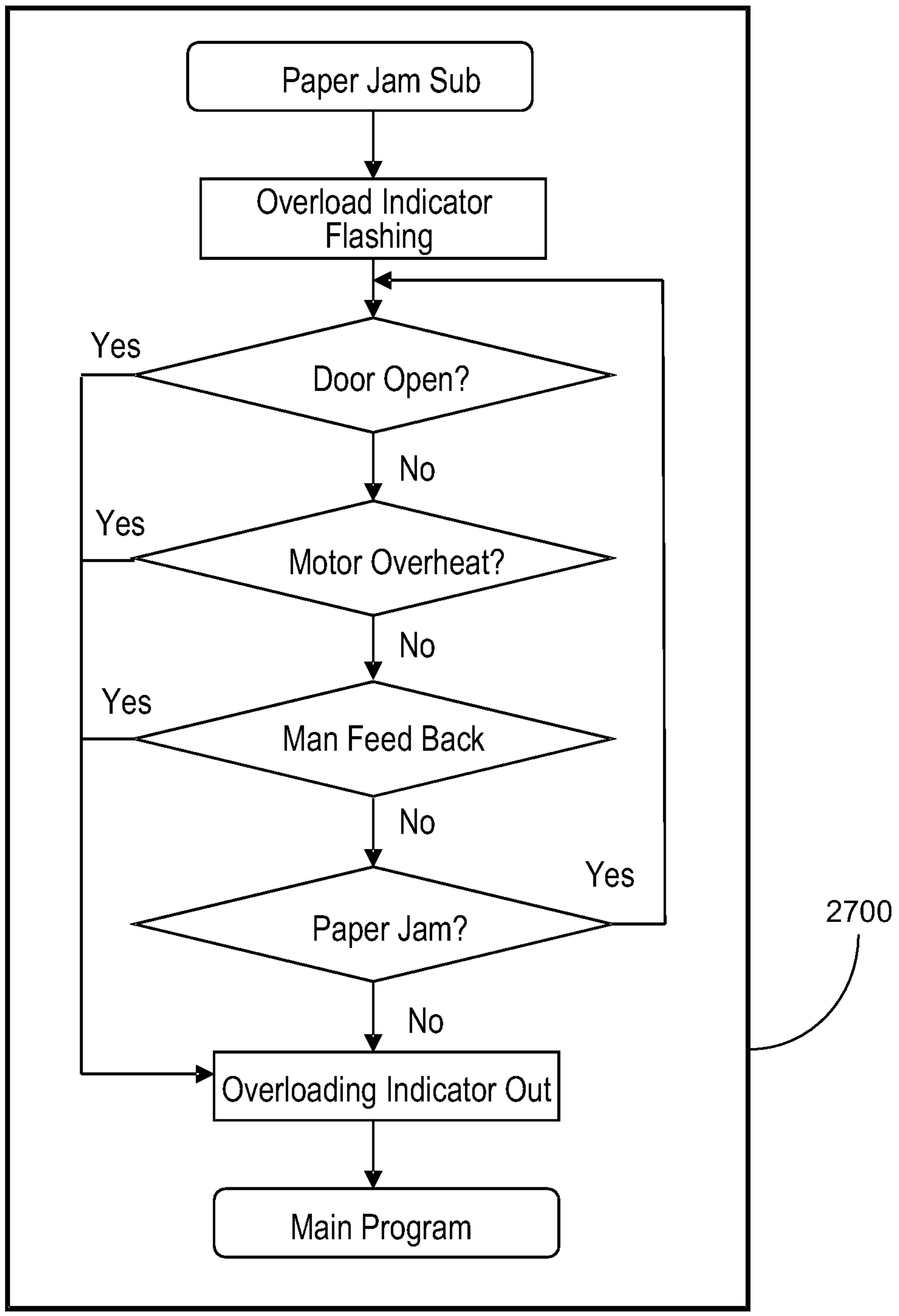
FIG. 27 is a flow diagram of a paper jam subprocess for a shredder operation, in accordance with the teachings of the present invention.
Figure 28:
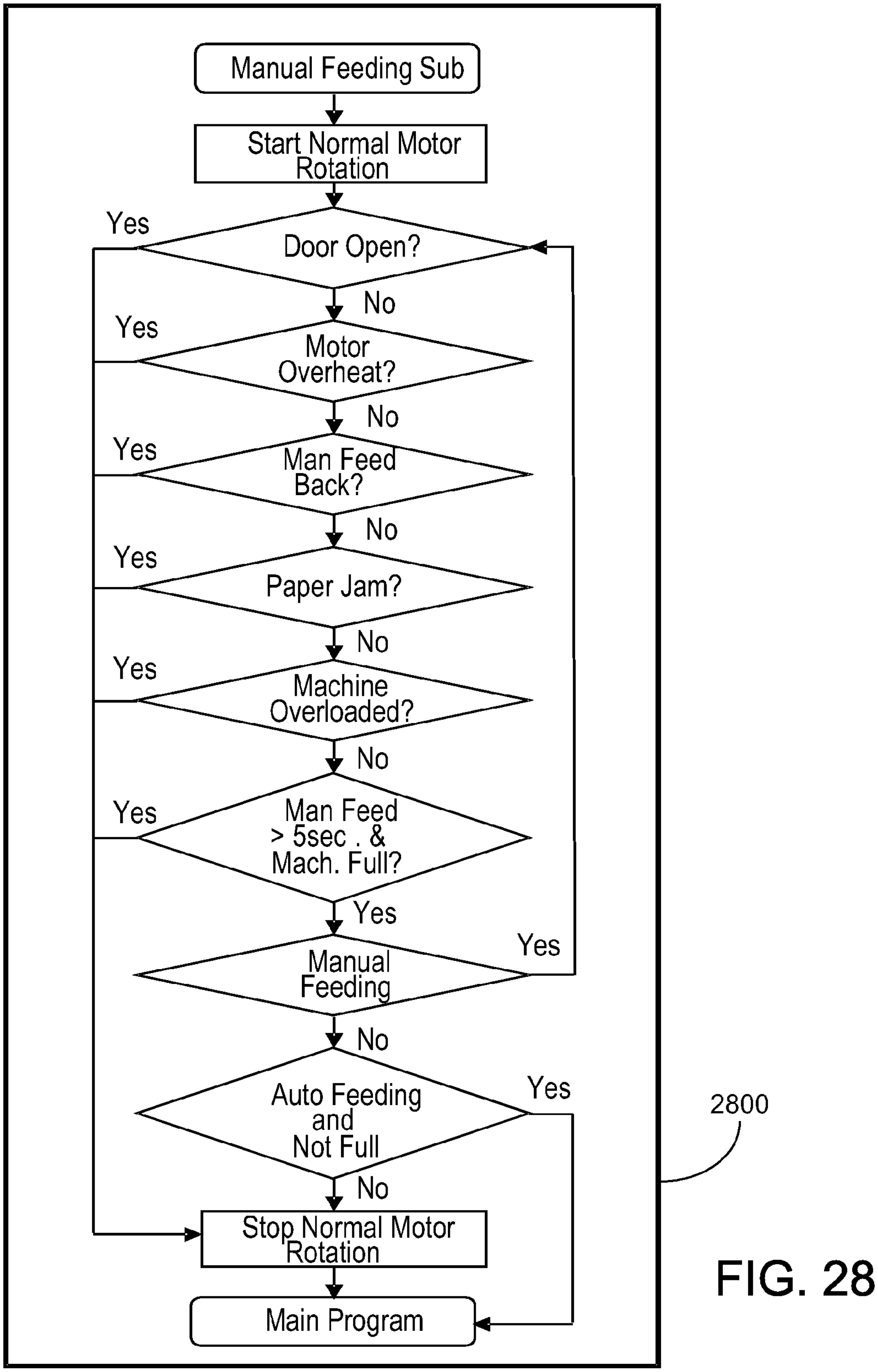
FIG. 28 is a flow diagram of a manual feeding subprocess for a shredder operation, in accordance with the teachings of the present invention.
Figure 30:
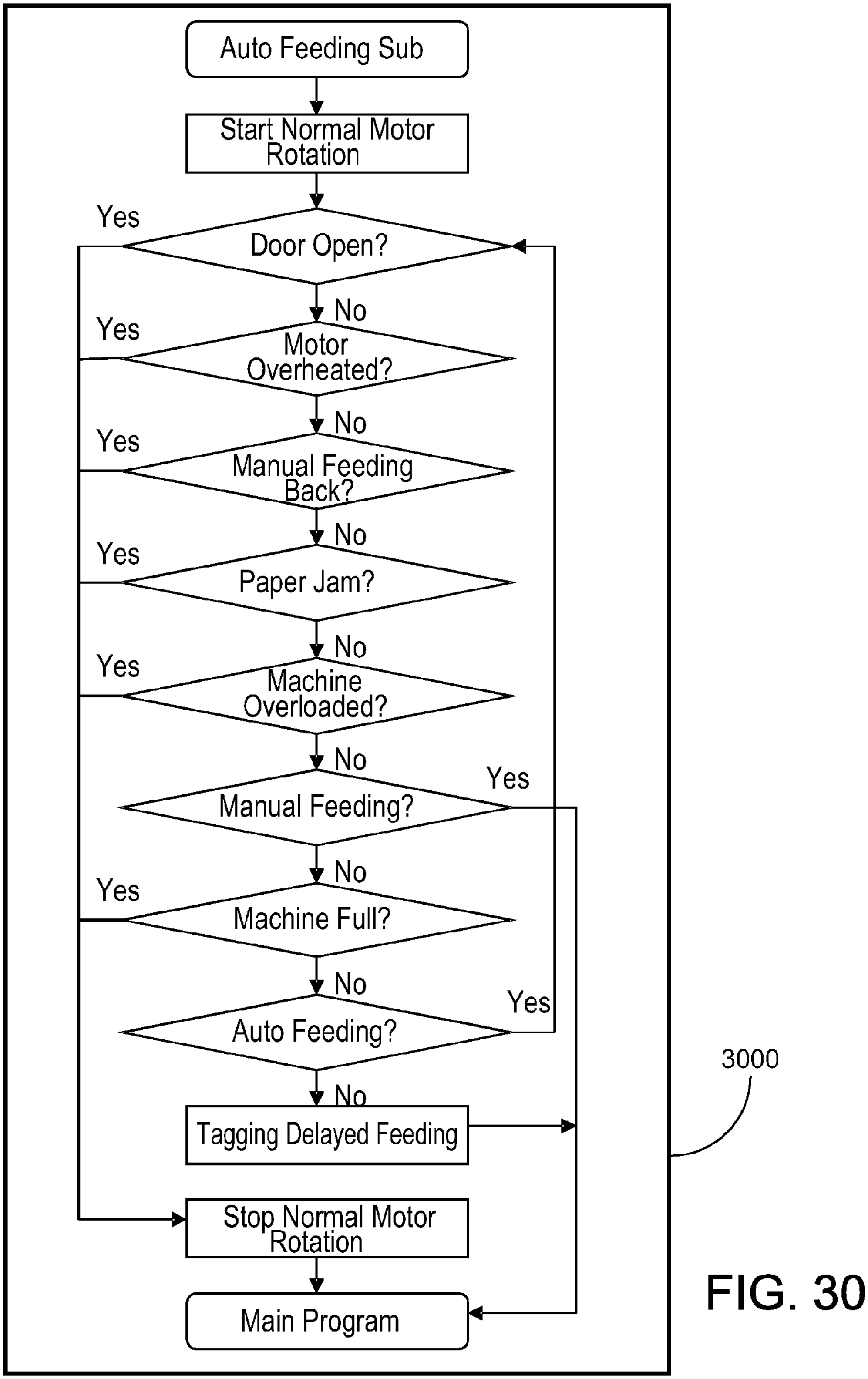
FIG. 30 is a flow diagram of an autofeeding subprocess for a shredder operation, in accordance with the teachings of the present invention.
Figure 31:
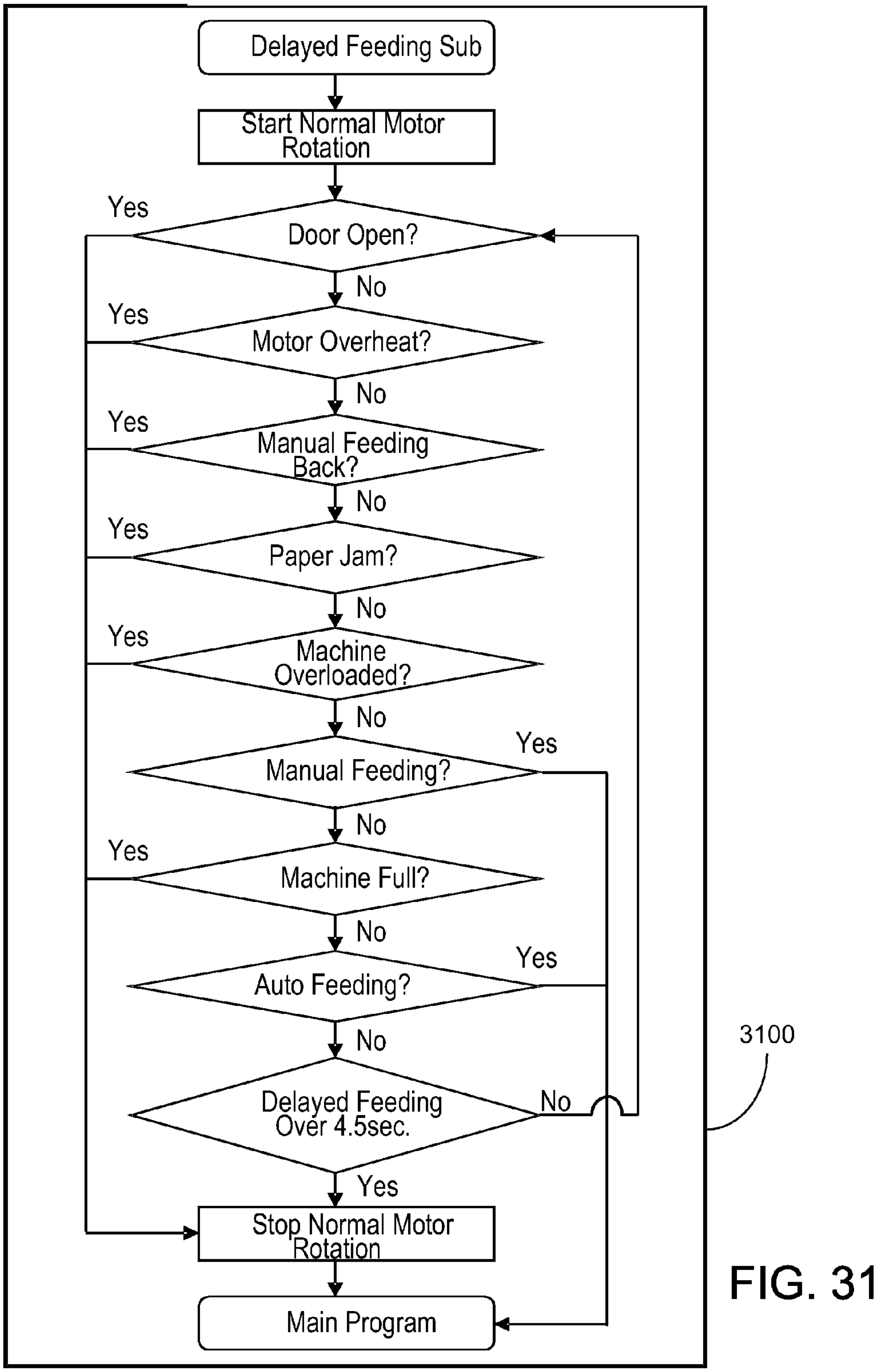
FIG. 31 is a flow diagram of a delayed feeding subprocess for a shredder operation, in accordance with the teachings of the present invention.
Figure 32:
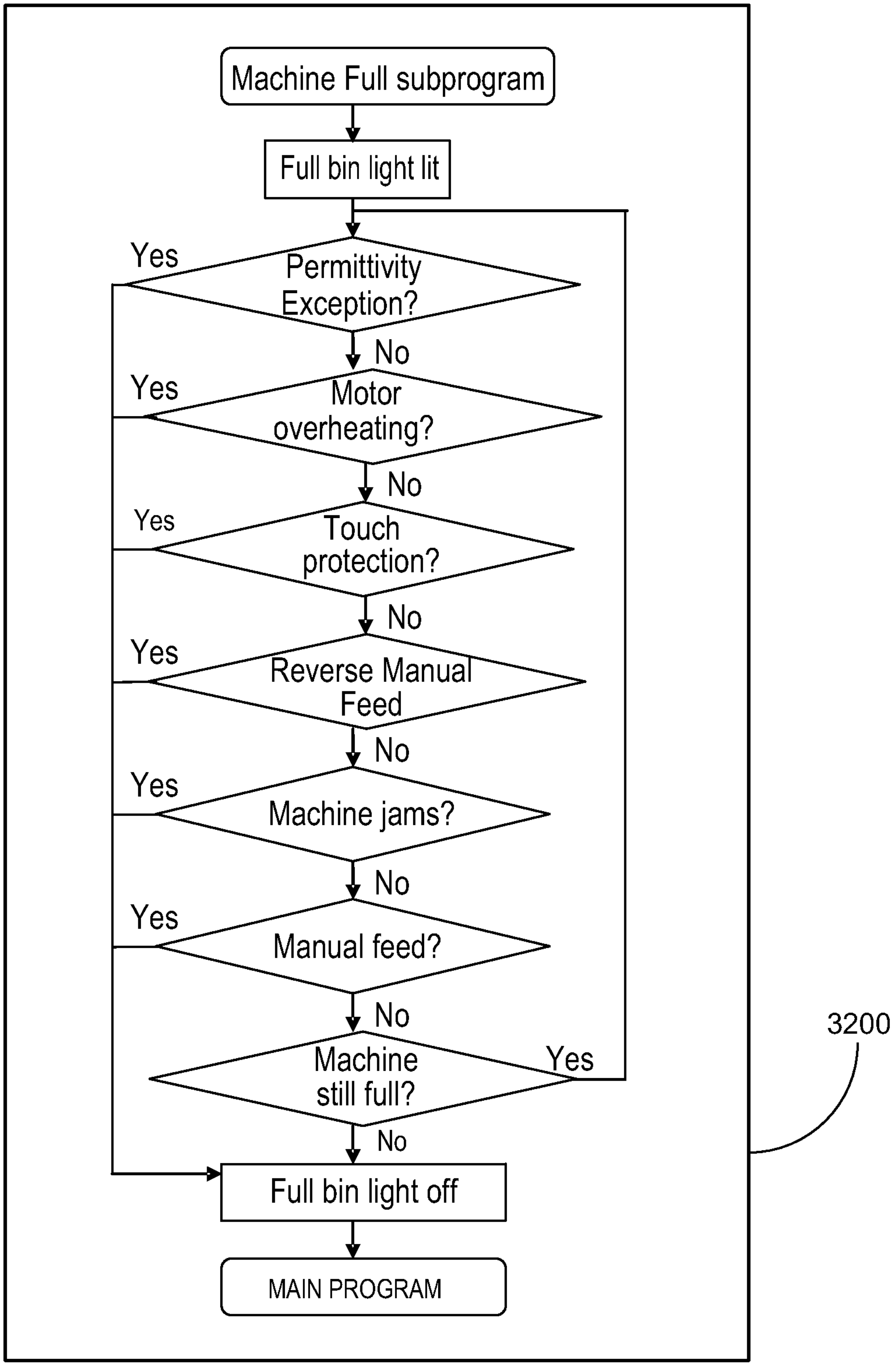
FIG. 32 is a flow diagram of a machine full subprocess for a shredder operation, in accordance with the teachings of the present invention.
Figure 33:
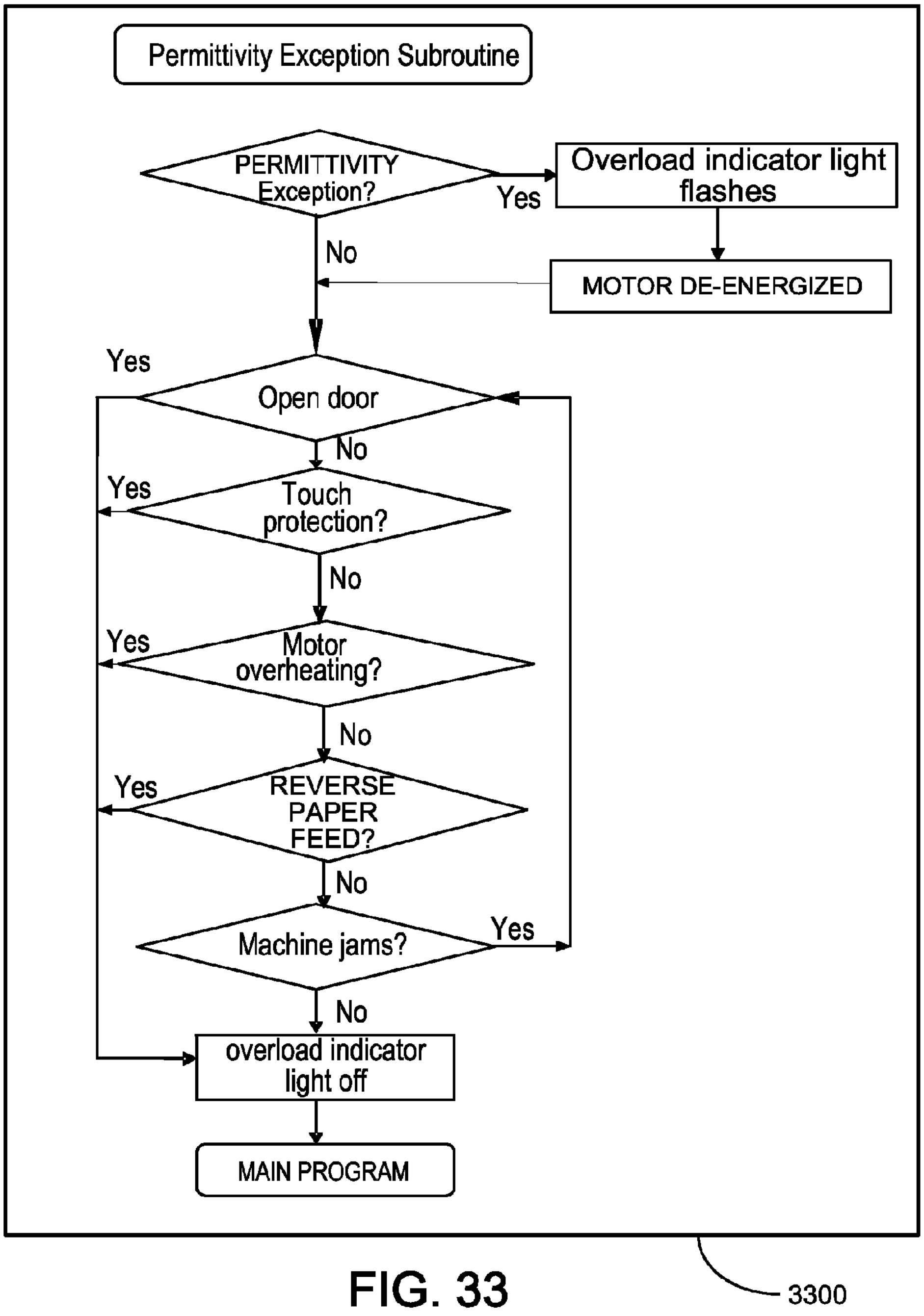
FIG. 33 is a flow diagram of a permittivity exception subprocess for a shredder operation, in accordance with the teachings of the present invention.
Figure 34:
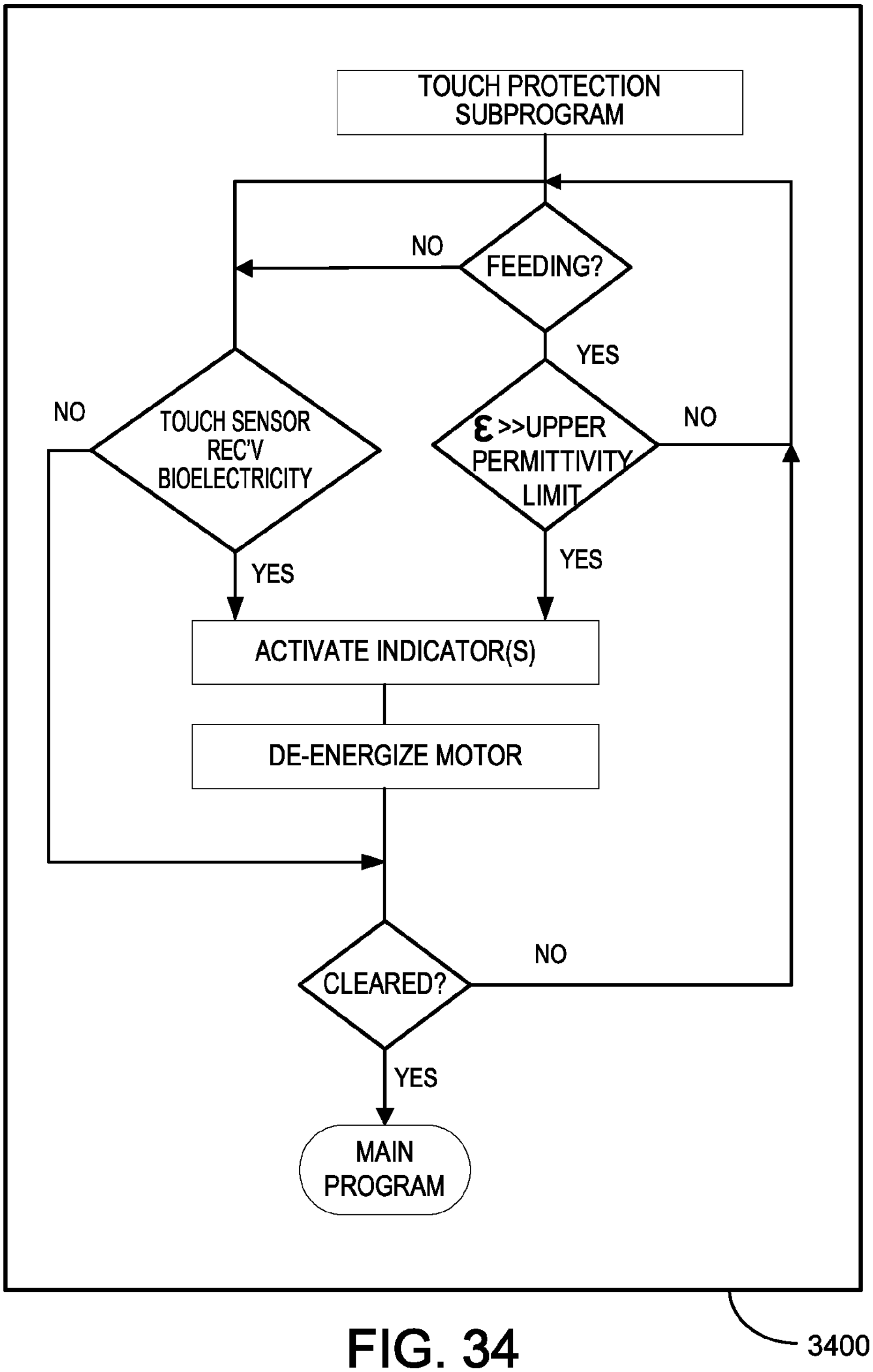
FIG. 34 is a flow diagram of a touch protection subprocess for a shredder operation, in accordance with the teachings of the present invention.

Non-limiting examples of a suitable process or a subprogram correspond to FIGS. 20-34, and descriptions pertaining to the respective FIGURES. A MAIN program may be coupled to at least one subprogram. One example embodiment of a MAIN PROGRAM 2000 (FIG. 20), operable to perform at least one subprogram process, in accordance with the current embodiments, may include, without limitation, a "BOOT INITIALIZATION" subprogram 2100 (FIG. 21), a "DOOR OPEN" subprogram 2200 (FIG. 22), an "OVERHEAT PROTECTION" subprogram 2300 (FIG. 23), a "TRIP SETTING" subprogram 2400 (FIG. 24); a "MACHINE OVERLOAD" subprogram 2500 (FIG. 25), a MANUAL FEEDING BACK subprogram 2600 (FIG. 26), a PAPER JAM subprogram 2700 (FIG. 27), a MANUAL FEEDBACK subprogram 2800 (FIG. 28); a MACHINE FULL subprogram 2900 (FIG. 29); a SELF-LOCK PROTECTION subprogram 3000 (FIG. 30), an AUTOFEED subprogram 3100 (FIG. 31), a DELAYED FEEDING subprogram 3200 (FIG. 32), or a PERMITTIVITY EXCEPTION subprogram 3300 (FIG. 33). The order in which these subprograms are represented is for explanation only and is not a functional limitation. As used herein, an indicator may be representative of a visual indicator (e.g., a light), an audio indicator (e.g., a buzzer), or an audiovisual indicator (e.g., a graphic illuminating along with a chime sounding).

Figure 20:
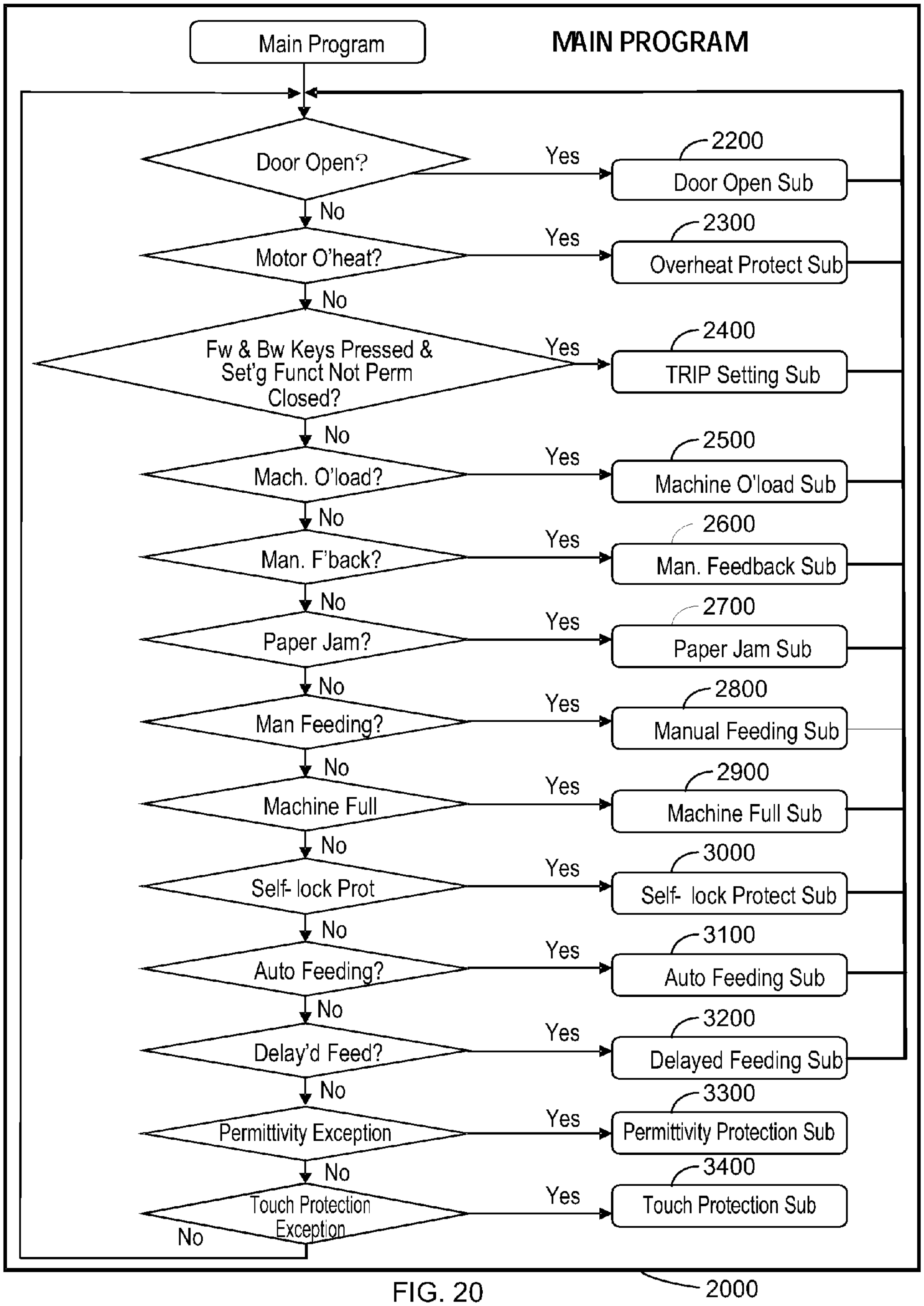
FIG. 20 is a flow diagram of a main process for a shredder operation, in accordance with the teachings of the present invention.

FIG. 20 illustrates a main logic flow for a shredder operation such as shredders described herein. One or more of the aforementioned subprograms may be implemented along with main logic flow 2000, including without limitation, a PERMITTIVITY EXCEPTION subprogram, such as subprogram 3300 (FIG. 33).

Figure 24:
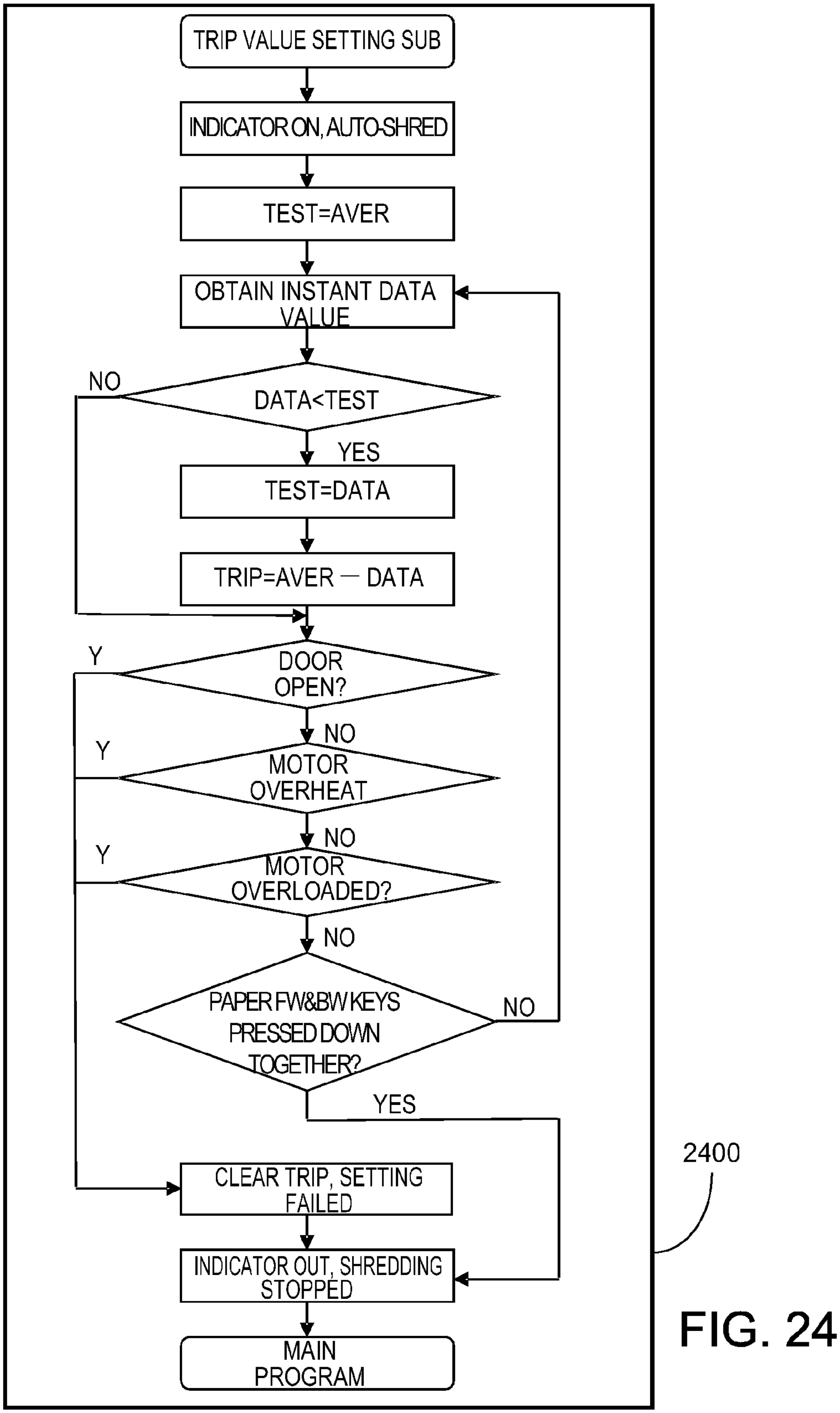
FIG. 24 is a flow diagram of a TRIP value setting subprocess for a shredder operation, in accordance with the teachings of the present invention.

Boot initialization subprogram 2100 may be used when the shredder is powered on, and data and status information can be initialized. TRIP SETTING subprogram 2400 sets operational and parametric setting for system functional states. System functional states are entered when an tagged operational or parametric value is reached. If the trip points which shape the functionality of the shredder are not set, the system state is tagged as such, for setting using, without limitation, TRIP SETTING subprogram 2400 (FIG. 24). After initialization, shredder functional control can be returned to the shredder control system.

Figure 23:
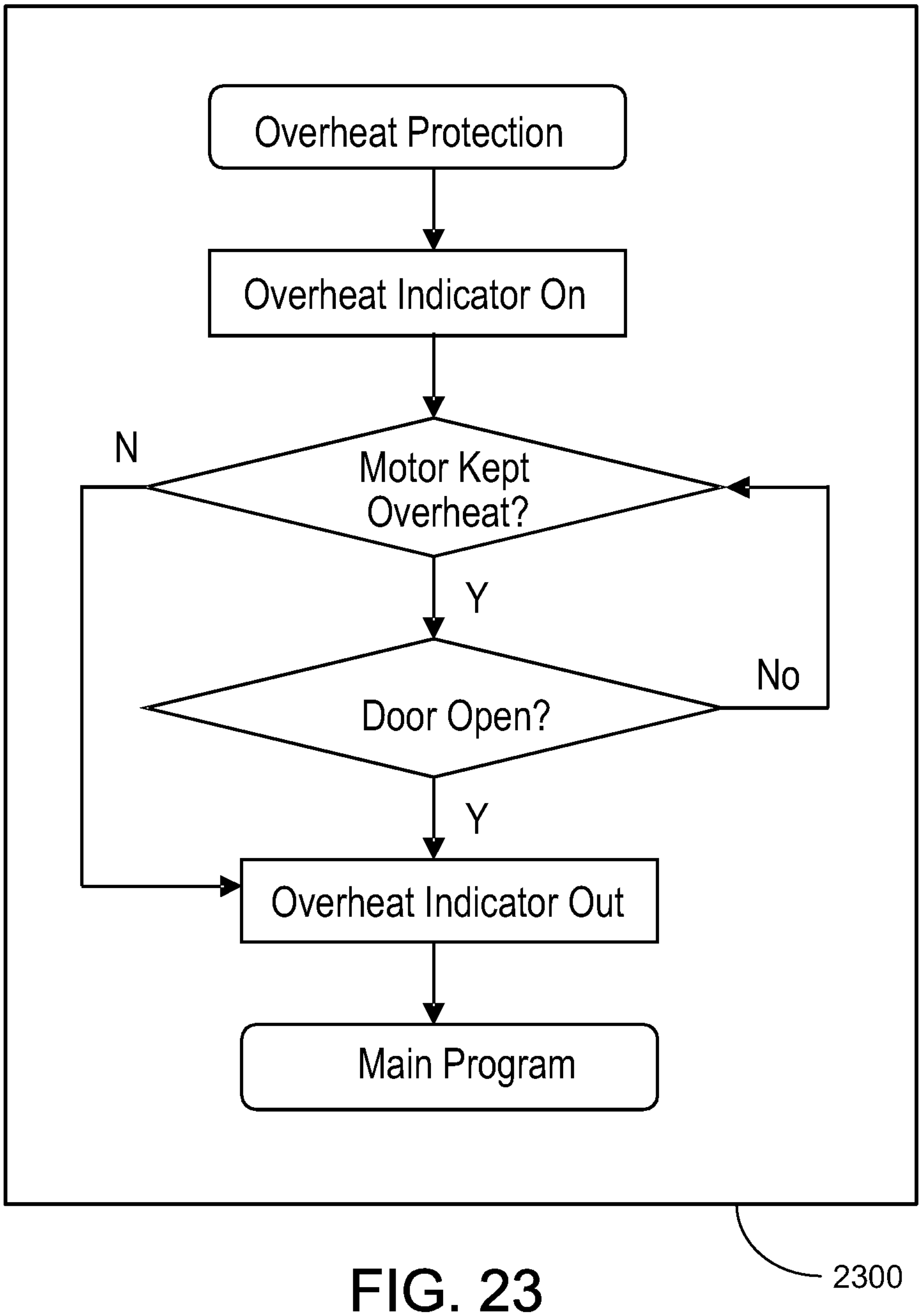
FIG. 23 is a flow diagram of a overheating protection subprocess for a shredder operation, in accordance with the teachings of the present invention.

Another subprogram example, DOOR OPEN subprogram 2200 (FIG. 22), in which Door Open Indicator on the shredder may go ON until the door is closed. However, if so supplied, a REVERSE (shredder direction) key may be pressed for over 3 seconds to permanently set a function of the shredder, which may be indicated by causing all indicator lights to flash once, although other indications may be used. Yet another subprogram embodiment may be exemplified by OVERHEAT PROTECTION subprogram 2300 (FIG. 23). During subprogram 2300, a motor overheating indicator may go ON and the shredder motor may be de-energized until a shredder operator checks the fault condition as exemplified by opening the door (and presumably seeking the reason of motor overheating). Once the door has been opened and then closed, the overheating indicator may go out, and the main program resumed.

TRIP SETTING subprogram 2400 (FIG. 24) may be used, for example, to set maxima and minima for trip points such as motor overheating, motor overloading, permittivity, an automated or a manual function, an indicator use, or a delay before an alarm is triggered. Until operational and parametric settings for system functional states (TRIP values) are set using this mode, values for functional states may be repeatedly accessed by users. Therefore, TRIP SETTING subprogram 2400 may be used by manufacturers, OEMs, and vendors to set values before providing a shredder to an end-user. TRIP SETTING subprogram 2400 also may be used to clear and to reset TRIP functions, if desired. For example, a value of "TEST" may be assigned to an average value for an incipient paper-jam. By setting a maximum trip point, and introducing a selected number of shreddant layers (and compositions) into the permittivity sensor of the feed inlet throat, a maximum value for shreddant may be set. Then a minimum number of shreddant layer(s) (and compositions) may be entered and set. The difference between these values indicates the maximum amount of shreddant that can be comminuted by the shredder just prior to jamming. This is one way by which shredders in accordance with this invention may be made essentially "jam proof." Upon completion of the TRIP SETTING subprogram 2400, functionality of the shredder may be returned to the main program 2000. If the door is opened, the motor overheats, or the shredder overheats, the TRIP SETTING subprogram will abort and return control to the main program 2000.

MACHINE OVERLOAD subprogram 2500 (FIG. 25) may be used to identify a shredder overload condition, responding by turning ON an indicator and by automatically reversing the direction of the motor (relative to normal shredding action) for about 2.5 seconds. If other fault states such as a door open, machine overheat, paper jam, manual feed mode, or machine full mode occur, one or more delay feed tags is set, the overload indicator is extinguished, and control is returned to the main program 2000. If the shredder is operating in an autofeeding mode, a self-lock protection state is tagged and control is returned to main program 2000.

MANUAL REVERSE FEED subprogram 2600 (FIG. 26), may be initiated by a shredder user, for example, by pressing a "reverse feed" (or REVERSE) actuator, causing the shredder motor to turn in a direction opposite from normal operation. The MANUAL REVERSE FEED subprogram can be alert to potential safety hazards, stopping the motor if a door is open, if the motor overheats, or if the shredder is operating in a MANUAL FEEDING mode (e.g., subprogram 2800 in FIG. 28). However, if the REVERSE actuator is released, if the shredder has been in MANUAL REVERSE FEED mode, for example, for about two seconds, or if the shredder is not in an AUTOMATIC FEEDING mode (e.g., subprogram 3100 in FIG. 31), the shredder motor may be turned off. In PAPER JAM subprogram 2700, a flashing (or intermittent) indicator identifying an OVERLOAD state can be initiated, or be ended if a door is open, overheating of the shredder motor, or clearing of the paper jam.

MANUAL FEEDING subprogram 2800 can initiate shredder motor operation, with the shredder motor turning in the normal (shredding) direction. However, MANUAL FEEDING subprogram 2800 can be aborted and the shredder motor de-energized (and stopped) if the shredder door is open, if the motor overheats, if the shredder receives a REVERSE FEED actuation signal, if there is a paper jam, if the shredder machine is overloaded, or the shredder has been operating for more than about five (5) seconds. Also if in the AUTOMATIC FEEDING mode (e.g., subprogram 3100 in FIG. 31) and the shredder receptacle is full, the motor also will be de-energized to stop normal rotation. Otherwise, control may be returned to the MAIN PROGRAM 2000. Shredder waste bins or receptacles have a finite capacity for comminuted shreddant and, thus, MACHINE FULL subprogram 2900 may be responsive to a full waste bin by providing a FULL indication thereof. Shredding may continue. If, during a JAM or overload condition and if paper shreddant still is detected by the detector, subprogram SELF-LOCK PROTECTION activates. SELF-LOCK action is one in which the shredder remains deactivated if a selected fault condition, e.g., OVERLOAD continues. However, if a PERMITTIVITY EXCEPTION (subprogram 3300, FIG. 33) is received, if the shredder motor overheats, if a TOUCH PROTECTION biosignal is produced, if the shredder is in MANUAL REVERSE FEED mode, if the shredder jams, if the shredder is placed into the MANUAL FEED mode, or if the shredder bin is no longer FULL, the FULL indication is extinguished, and control is returned to the main subroutine where, if a fault state exists (e.g., if the shredder motor overheats), the corresponding subprogram will process the respective fault state, e.g., by de-energizing the shredder motor.

Figure 29:
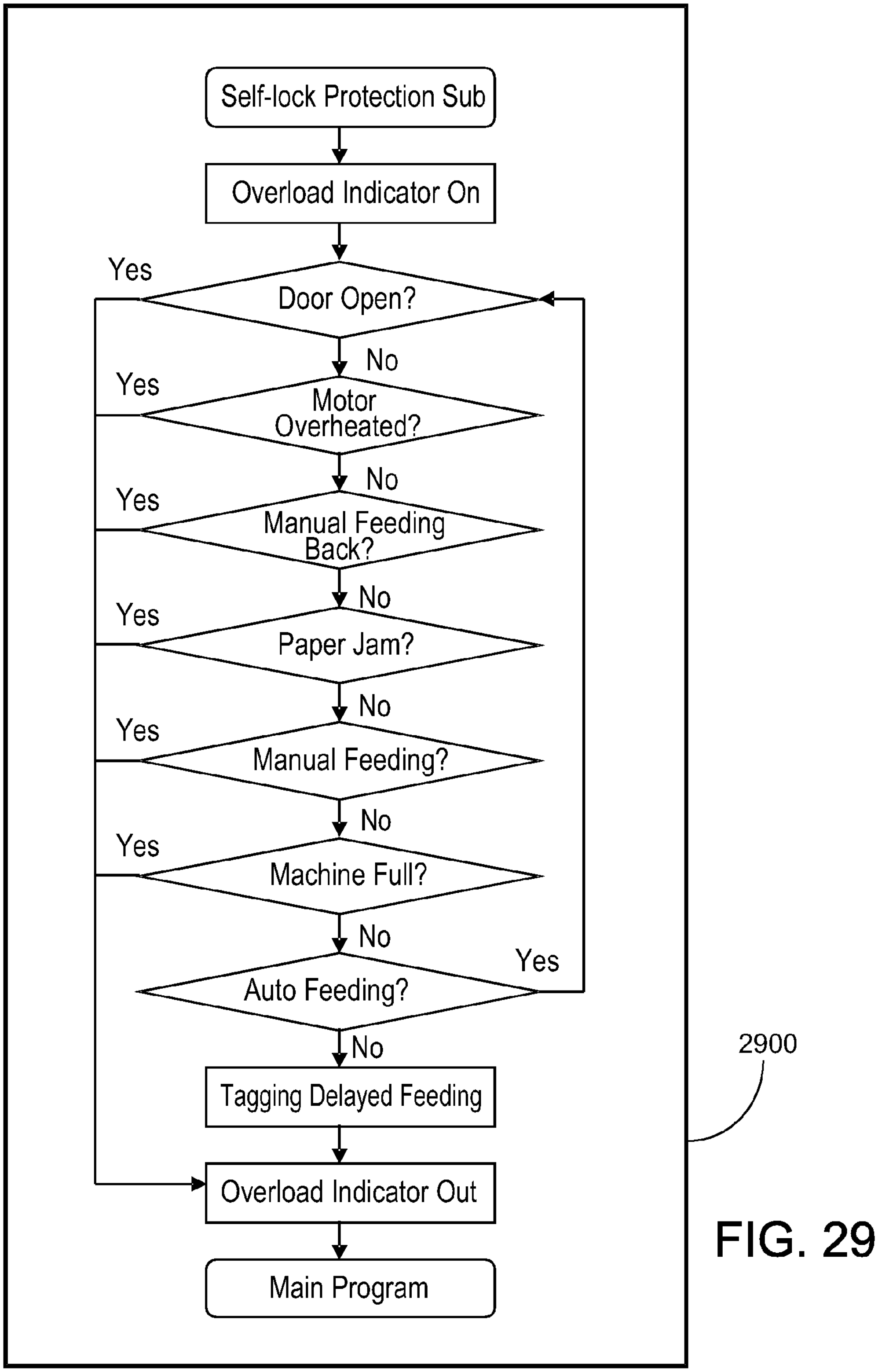
FIG. 29 is a flow diagram of a self-lock protection subprocess for a shredder operation, in accordance with the teachings of the present invention.

In the AUTOFEED subprogram 3000, the shredder will turn on automatically, and normal motor rotation will commence, upon the introduction of an appropriate amount of shreddant into the feed inlet. However, as indicated in FIG. 29, in the event of a fault state, the motor rotation is stopped and control is returned to MAIN PROGRAM 2000. In a DELAYED FEED subprogram 3100, the shredder motor will operate after, for example a delay of about 2.5 seconds for clearing an overload from the printer. In the MACHINE FULL subprogram 2200, sensing of a full waste bin by a shredder controller circuit initiates an indicator, for example a FULL BIN light. Once the bin is cleared below the FULL trip point, the FULL BIN light may be extinguished, and control may be returned to the MAIN PROGRAM 2000. In PERMITTIVITY EXCEPTION subprogram 3300, if an out-of-bounds permittivity value is detected, then the shredder motor is de-activated and an indicator light flashes until the condition is cleared; after which the indicator light is extinguished and the motor is re-activated and made ready to operate. In the TOUCH PROTECTION subprogram 3400, motor de-energization may occur in at least two ways. First, if any touch sensor receives bioelectricity from a living being, the sensor converts the received bioelectricity into a biosignal which is used by a controller to activate TOUCH PROTECTION indicator and to de-energize the shredder motor. Second, if, during feeding, a sensed permittivity value exceeds an upper permittivity limit, then touch is assumed, which produces into a biosignal which is used by a controller to activate TOUCH PROTECTION indicator and to de-energize the shredder motor. Once the condition has cleared, control is returned to the MAIN PROGRAM 2000.

Combinations of aforementioned safety elements would be readily apparent to a person having ordinary skill in the art in light of the present teachings.

Beneficial Uses

Embodiments of the present invention provide the following beneficial uses:

1. Enhanced product safety for living beings, including adult and child humans, and pets.
2. Improved structural support for shredder assembly elements
3. Improved structural integrity of shredder
4. Enhanced product reliability
5. Extended product service life
6. Reduced product operational costs and maintenance.

As detailed above, the permittivity-based paper shredder control system has adopted cascaded circuits. On the machine feed throat there is a blade touch sensor, which is connected to bioelectricity controlled switching circuit, ground switching circuit, bioshield controller, and then shredder mechanical part, including a blade restraint. All of these circuits ensure safety when a human, or other living being, touches the permittivity-based shredder blade. The electricity from a human body actuates the bioelectricity-controlled switching circuit, followed by all of the connected circuits. The bioshield controller disables the shredder mechanical part and it ensures human safety. Even if the power switch is turned on, the mechanical part of the shredder still won't work if a human is touching the permittivity-based shredder blade. As with the aforementioned permittivity-based panel, the shredder can use the permittivity-based shredder blade to realize real time monitoring with a control process that is both safe and sensitive. The machine performance is stable and reliable. It is easy to operate without human intervention, can be applied in wide situations, and brings safety assurance. Similarly, the permittivity-based paper shredder may operate when shreddant permittivity detected at the shredder feed inlet is within a predetermined permittivity range, and may indicate a PERMITTIVITY EXCEPTION when a value is determined to be outside of the range. Permittivity sensing assists in reducing the likelihood of shredder jamming, shredder motor overheating, or shredder motor overloads, and may prolong the life of a shredder by reducing these stressors. Serendipitously, permittivity sensing also may perform a touch protection function due to the permittivity of living beings occurring at a PERMITTIVITY EXCEPTION value. A person having ordinary skill in the art would recognize foreseeable modifications and alternatives in light of the foregoing disclosure.

Although the present invention has been described in terms of example embodiments, it is to be understood that neither the Specification nor the Drawings are to be interpreted as limiting. Various alternations and modifications are inherent, or will become apparent to those skilled in the art after reading the foregoing disclosure. It is intended that the appended claims be interpreted as covering all alternations and modifications that are encompassed by the spirit and the scope of the invention. Therefore, unless such changes and modifications depart from the scope of the present invention, they should be construed as being included therein.

What is claimed is:

1. A paper shredder actuator in a paper shredder having a feed throat disposed to receive shredding material, comprising:

a sentinel switch disposed in the feed throat, and configured to admit electrical power to electrical elements of the paper shredder when shredding material is contact with the sentinel switch;

a permittivity sensor configured to receive admitted electrical power, wherein the permittivity sensor generates a permittivity-sensing field therewithin, the permittivity sensor causing shredding material comminution when the shredding material disrupts the permittivity-sensing field;

and a timer activated by the sentinel switch, wherein the timer is configured to connect electrical power from electrical elements of the paper shredder, and wherein the timer is configured to disconnect electrical power from electrical elements of the paper shredder, upon expiration of a preselected interval of time.

2. The paper shredder actuator of claim 1, further comprising:

a bioelectric cut-off switch configured to sense an electrical voltage from a living being in contact with selected elements of the paper shredder, and configured to bypass the preselected interval of time and to cause the timer to indicate expired time upon contact with the living being.

3. The paper shredder actuator of claim 1, further comprising:

a logic controller board coupled to the permittivity sensor causing shredding material comminution when the logic controller board receives from the permittivity sensor an indication that shredding material disrupts the permittivity-sensing field.

4. The paper shredder actuator of claim 3, further comprising:

an electric motor coupled between the permittivity sensor and the a logic controller board, the electric motor effecting shredding material comminution when power is connected to the electric motor and ceasing shredding material comminution when power is disconnected.

5. A paper shredder control system, comprising:

a conductive shredder element;

a shredder blade;

a shredder mechanical part coupled to the shredder blade and configured to stop the shredder blade;

a control unit coupled to the conductive shredder element and capable of detecting bioelectricity from a living being applied to the conductive shredder element, the control unit coupled to the shredder mechanical part and configured to stop the shredder blade responsive to detected bioelectricity;

a feed channel proximate to the shredder mechanical part, and a permittivity sensor disposed in the feed channel and coupled to the control unit, wherein the permittivity sensor cooperates with the control unit to stop the shredder blade responsive to a material exceeding a predetermined permittivity being interposed in the feed channel.

6. The paper shredder control system of claim 5, wherein the shredder mechanical part further comprises a mechanical restraint having a clutch.

7. The shredder control system of claim 5, further comprising:

an electromagnetic motor coupled to the shredder mechanical part and coupled to the shredder blade, wherein motor operation drives shredder blade motion; and an electromagnetic braking circuit coupled in the control unit to the motor, wherein the control unit is configured to cause electromagnetic braking of the motor, and wherein the control unit provides substantially real-time monitoring of contact between the conductive shredder element and a living being, and wherein the control unit causes electromagnetic braking of the motor responsive to living being contact with the conductive shredder element.

8. The paper shredder control system of claim 5, wherein:

the shredder mechanical part includes a reversible shredder motor;

the control unit includes a three position switch having, on, off, and reverse positions; and the control unit is operable to disable the reversible shredder motor when the three position switch is in the ON position or in the REVERSE position.

9. The paper shredder control system of claim 5, wherein:

power to the reversible shredder motor is controlled by a relay switch.

10. The paper shredder control system of claim 5, wherein the bioelectricity is a static electrical charge produced by the living being.

11. The paper shredder controller of claim 5 wherein the bioelectricity is a flowing electrical charge produced by the living being.

12. A paper shredder system, comprising:

a shredder motor;

a paper shredder blade;

a bioelectricity-controlled switching circuit coupled to the paper shredder blade;

a biosensor coupled to the bioelectricity-controlled switching circuit and responsive to bioelectricity received from a living being;

a shredder control unit coupled between the bioelectricity-controlled switching circuit and the shredder motor; and a permittivity controller coupled to the shredder control unit and configured to cooperate with the shredder control unit to stop the shredder motor before a material having at a preselected permittivity is shredded by the paper shredder blade, wherein the bioelectricity-controlled switching circuit cooperates with the shredder control unit to stop the shredder motor when a living being-contacts, and applies bioelectricity to, the biosensor.

13. The permittivity-based paper shredder system of claim 12 further comprising:

an optical coupler interposed in an electrical path between the biosensor and the shredder control unit, wherein a bioelectricity signal from the bioelectricity-controlled switching circuit is coupled through the optical coupler to actuate the shredder control unit to stop an operating shredder motor.

14. The permittivity-based paper shredder system of claim 13, further comprising a grounding switch circuit coupled to transmit to the optical coupler, a bioelectricity signal received from the bioelectricity-controlled switching circuit, wherein the grounding switch circuit couples the bioelectricity signal from the bioelectricity-controlled switching circuit to the optical coupler.

15. The permittivity-based paper shredder system of claim 14, wherein the bioelectricity-controlled switching circuit further comprises:

a first cascaded transistor having a base coupled to the biosensor, a collector coupled to a power supply, and an emitter coupled the base of a second cascaded transistor, wherein the emitter of the second cascaded transistor is coupled to an optical coupler input.

16. The permittivity-based paper shredder system of claim 12, wherein the bioelectricity signal is a static electrical charge produced by the living being.

17. The permittivity-based paper shredder system of claim 12, wherein the bioelectricity signal is a flowing electrical charge produced by the living being.

18. A paper shredder system comprising:

a shredder blade;

a powered shredder motor coupled to the shredder blade;

a permittivity sensor coupled to the shredder motor and configured to activate the powered shredder motor in response to receiving a shreddable material within in a predetermined permittivity range;

a timer coupled between the permittivity sensor and the motor, configured to deactivate the powered shredder motor, after a predetermined inactivity period by the powered shredder motor;

a biosensor responsive to bioelectricity from a living being with a biosignal;

a bioshield controller, having a control switch coupled to the powered motor; and an optical isolator coupled to receive a biosignal from the biosensor and configured to electrically isolate the biosignal transmitted to the bioshield controller, wherein, while the shredder is operating, the biosignal actuates the bioshield controller to operate a control switch to stop the powered shredder motor, and wherein the control switch is a reed switch.

19. The permittivity-based paper shredder system of claim 18, wherein the bioelectricity signal produced by the living being is one of a static electrical charge or a flowing electrical charge.

20. A method of controlling a paper shredder with a permittivity-based device comprising:

providing a powered shredder motor, which can be operated in one of a forward direction or a reverse direction;

providing a shredder blade capable of being moved by the powered shredder motor;

coupling a permittivity-based sensor to the a shredder element, wherein the permittivity-based sensor can be energized by a bioelectrical signal of a living being;

providing a control circuit coupled to the permittivity-based sensor and configured to receive a biosignal representative of a received bioelectric signal; and configuring the control circuit to cease operation of the powered shredder motor in one of a forward direction or a reverse direction, responsive to the living being contacting the permittivity-based sensor.

21. The method of claim 20, further comprising:

providing electrical isolation between the permittivity-based sensor and a voltage that operates one or both of the control circuit and the powered shredder motor.

22. A paper shredder safety system comprising:

a shredder blade;

a powered reversible shredder motor coupled to the shredder blade;

a safety control circuit coupled to the powered reversible shredder motor;

a ground switching circuit coupled to the safety control circuit;

a bioelectricity controlled switching circuit coupled to the safety control circuit, and including a permittivity-based sensor, wherein when a bioelectricity signal is sensed from a living being in contact with the permittivity-based sensor, the safety control circuit responsively actuates the ground switching circuit to stop the powered reversible shredder motor.

23. The paper shredder safety system of claim 22, further comprising:

a safety switch having an electrical member coupled to the safety control circuit and a mechanical member coupled to proximally mate with an articulating portion of a shredder chassis, wherein the electrical member transmits a safety switch signal to the safety control circuit when the proximal mating of the mechanical member and the articulating portion is disrupted, and wherein the safety control circuit actuates the control circuit to stop the powered reversible shredder motor, and wherein the electrical member includes the permittivity-based sensor.

24. The paper shredder safety system of claim 23, wherein the touch sensitive sensor is connected to at least one of a paper shredder blade, a metalized paper shredder frame member, a metalized paper shredder blade spacer, or a metalized blade shield.

25. A paper shredder, comprising:

a sentinel switch disposed on a paper shredder, and configured to admit electrical power to electrical elements of the paper shredder when shredding material is contact with the sentinel switch;

a permittivity sensor configured to receive admitted electrical power, wherein the permittivity sensor generates a permittivity-sensing field therewithin, the permittivity sensor causing shredding material comminution when the shredding material disrupts the permittivity-sensing field;

a timer activated by the sentinel switch, wherein the timer is configured to disconnect electrical power from electrical elements of the paper shredder, upon expiration of a preselected interval of time; and the shredder includes a conductive member of at least one of a paper shredder blade, a metalized paper shredder frame member, a metalized paper shredder blade spacer, or a metalized blade shield;

a bioelectricity controlled switching circuit responsive to a bioelectric signal received from a living being to the conductive member, wherein the bioelectricity controlled switching circuit is configured to disconnect electrical power from the electrical elements of the paper shredder responsive to the bioelectric signal received on the conductive member, wherein the paper shredder is autonomous.

* * * * *